United States Patent
Xu et al.

(10) Patent No.: US 12,082,131 B2
(45) Date of Patent: Sep. 3, 2024

(54) TIME SYNCHRONIZATION METHOD AND APPARATUS

(71) Applicant: HUAWEI TECHNOLOGIES CO., LTD., Guangdong (CN)

(72) Inventors: Xiaoying Xu, Shanghai (CN); Qufang Huang, Shenzhen (CN); Feng Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 17/365,346

(22) Filed: Jul. 1, 2021

(65) Prior Publication Data

US 2021/0337491 A1 Oct. 28, 2021

Related U.S. Application Data

(63) Continuation of application No. PCT/CN2019/126790, filed on Dec. 19, 2019.

(30) Foreign Application Priority Data

Jan. 7, 2019 (CN) .......................... 201910013535.5

(51) Int. Cl.
*H04W 56/00* (2009.01)
*G01S 19/25* (2010.01)

(52) U.S. Cl.
CPC ......... *H04W 56/001* (2013.01); *G01S 19/256* (2013.01); *H04W 56/006* (2013.01)

(58) Field of Classification Search
CPC ............................. H04J 3/0667; H04J 3/0644
See application file for complete search history.

(56) References Cited

U.S. PATENT DOCUMENTS

| 2016/0050624 A1 | 2/2016 | Tirronen et al. |
| 2018/0083688 A1 | 3/2018 | Agiwal et al. |

(Continued)

FOREIGN PATENT DOCUMENTS

| CN | 102056283 A | 5/2011 |
| CN | 102083194 A | 6/2011 |

(Continued)

OTHER PUBLICATIONS

3GPP TR 23.734 V16.0.0 (Dec. 2018), 3rd Generation Partnership Project; Technical Specification Group Services and System Aspects; Study on enhancement of 5GS for Vertical and LAN Services (Release 16). (Year: 2018).*

(Continued)

*Primary Examiner* — Yee F Lam
(74) *Attorney, Agent, or Firm* — Fish & Richardson P.C.

(57) ABSTRACT

The present disclosure relates to time synchronization methods and apparatus. In one example method, a terminal receives a system information block (SIB) sent by a distributed unit (DU), where the SIB is generated by the DU, the SIB includes time information, and the time information indicates a moment corresponding to a boundary of a system frame number (SFN) at which an end boundary of a system information (SI) window for sending the SIB is located, or indicates a moment corresponding to a boundary of an SFN immediately after an end boundary of an SI window for sending the SIB. The UE processes the time information to obtain a time reference.

14 Claims, 15 Drawing Sheets

(56) References Cited

U.S. PATENT DOCUMENTS

| | | | |
|---|---|---|---|
| 2018/0279186 A1 | 9/2018 | Park et al. | |
| 2018/0324645 A1 | 11/2018 | Park et al. | |
| 2018/0368109 A1 | 12/2018 | Kim | |
| 2018/0376380 A1 | 12/2018 | Leroux | |
| 2019/0086555 A1* | 3/2019 | Chandrasekar | H04W 4/02 |
| 2019/0190635 A1* | 6/2019 | Goel | H04W 56/004 |
| 2019/0191403 A1* | 6/2019 | Goel | H04L 27/2695 |
| 2019/0239172 A1* | 8/2019 | Hampel | H04W 56/0065 |
| 2020/0059829 A1* | 2/2020 | Joseph | H04W 36/0011 |
| 2020/0120536 A1* | 4/2020 | Prakash | H04W 72/21 |
| 2021/0392601 A1* | 12/2021 | Takeda | H04W 56/0045 |
| 2022/0030530 A1* | 1/2022 | Munz | H04L 12/4625 |
| 2022/0200733 A1* | 6/2022 | Toeda | H04L 1/1642 |

FOREIGN PATENT DOCUMENTS

| | | | |
|---|---|---|---|
| CN | 103796296 | A | 5/2014 |
| CN | 105228240 | A | 1/2016 |
| CN | 108352968 | A | 7/2018 |
| CN | 109150562 | A | 1/2019 |
| CN | 109151997 | A | 1/2019 |
| JP | 2020511805 | A | 4/2020 |
| JP | 2020515157 | A | 5/2020 |
| WO | 2018170481 | A1 | 9/2018 |
| WO | 2018170516 | A2 | 9/2018 |
| WO | 2018204863 | A1 | 11/2018 |

OTHER PUBLICATIONS

3GPP TR 22.804 V16.2.0 (Dec. 2018), "3rd Generation Partnership Project;Technical Specification Group Services and System Aspects;Study on Communication for Automation in Vertical Domains(Release 16)," Dec. 2018, 196 pages.

3GPP TS 38.331 V15.3.0 (Sep. 2018), "3rd Generation Partnership Project;Technical Specification Group Radio Access Network;NR-;Radio Resource Control (RRC) protocol specification(Release 15)," Sep. 2018, 445 pages.

3GPP TS 38.473 V15.3.0 (Sep. 2018), "3rd Generation Partnership Project;Technical Specification Group Radio Access Network; NG-RAN;F1 application protocol (F1AP)(Release 15)," Sep. 2018, 176 pages.

3GPP TR 38.801 V14.0.0 (Mar. 2017), "3rd Generation Partnership Project;Technical Specification Group Radio Access Network;Study on new radio access technology: Radio access architecture and interfaces(Release 14)," Mar. 2017, 91 pages.

3GPP TR 38.816 V15.0.0 (Dec. 2017), "3rd Generation Partnership Project;Technical Specification Group Radio Access Network;Study on CU-DU lower layer split for NR;(Release 15)," Dec. 2017, 16 pages.

LG Electronics Inc., "Discussion on paging function," 3GPP TSG-RAN WG3 Meeting #97, R3-172998, Berlin, Germany, Aug. 21-25, 2017, 3 pages.

Office Action issued in Chinese Application No. 201910013535.5 on May 6, 2021, 6 pages (with English translation).

PCT International Search Report and Written Opinion issued in International Application No. PCT/CN2019/126790 on Mar. 25, 2020, 13 pages (with English translation).

Yan et al., "Discussion on CU-DU Architecture, Equipment, Implementation and Application in 5G," Mobile Communications, vol. 42, No. 1, Jan. 2018, 6 pages (with English abstract).

Office Action in Australian Appln. No. 2019420455, dated Nov. 22, 2022, 5 pages.

Extended European Search Report issued in European Application No. 19909240.4 on Dec. 17, 2021, 9 pages.

Fuentes et al., "5G-Xcast Tutorial Broadcast and Multicast Communication Enablers for 5G," WP3: 5G-Xcast Radio Access Network, Jun. 5, 2018, 83 pages.

LG Electronics Inc., et al., "Discussion on paging function," 3GPP TSG-RAN WG3 Meeting #97bis, R3-173787, Prague, Czech Republic, Oct. 9-13, 2017, 3 pages.

3GPP TS 38.401 V15.3.0 (Sep. 2018), "3rd Generation Partnership Project; Technical Specification Group Radio Access Network; NG-RAN; Architecture Description (Release 15)," Sep. 2018, 40 pages.

NTT Docomo, Inc., "Time Synchronization for IIOT," 3GPP TSG-RAN WG2 #104, R2-1818254, Spokane, USA, Nov. 12-16, 2018, 11 pages.

Office Action issued in Japanese Application No. 2021-536267 on Aug. 30, 2022, 12 pages (with English translation).

ZTE Corporation, "Consideration on Accurate Reference Timing Delivery in TSN for NR-IIoT," 3GPP TSG-RAN2 Meeting #104, R2-1817812, Spokane, USA, Nov. 12-16, 2018, 7 pages.

ZTE, "Discussion on CU-DU Node Synchronization," 3GPP TSG RAN WG3 Meeting #97bis, R3-173676, Prague, Czech Republic, Oct. 9-13, 2017, 4 pages.

Office Action in Japanese Appln. No. 2021-536267, mailed on Aug. 29, 2023, 4 pages (with English translation).

* cited by examiner

TIME SYNCHRONIZATION METHOD AND APPARATUS

CROSS-REFERENCE TO RELATED APPLICATIONS

This application is a continuation of International Application No. PCT/CN2019/126790, filed on Dec. 19, 2019, which claims priority to Chinese Patent Application No. 201910013535.5, filed on Jan. 7, 2019. The disclosures of the aforementioned applications are hereby incorporated by reference in their entireties.

TECHNICAL FIELD

Embodiments of this application relate to the field of communication technologies, and in particular, to a time synchronization method and apparatus.

BACKGROUND

As a main driving force for development of future communication, the mobile internet and the internet of things have great impact on fields such as people's residence, work, leisure, and transportation. Currently, in fields such as industrial control, a smart grid, and self driving, very high time synchronization (for example, microsecond-level synchronization) is required between terminals.

In an existing long term evolution (LTE) system, high-precision time information (where for example, the precision is 0.25 microsecond or even smaller than 0.25 microsecond) may be sent to a terminal in a broadcast or unicast manner, to implement time synchronization between terminals. However, when a centralized unit (CU) and a distributed unit (DU) are separated from each other, because a transmission delay between the CU and the DU is relatively large, a current technology cannot resolve how to implement time synchronization between terminals when the CU and the DU are separated from each other. Therefore, when the CU and the DU are separated from each other, how to ensure that a network side provides accurate timing for a terminal becomes a problem to be resolved urgently.

SUMMARY

Embodiments of this application provide a time synchronization method and apparatus, so that in a CU-DU split architecture, a DU or a CU is expected to determine high-precision time information, thereby implementing relatively precise time synchronization between terminals.

To achieve the foregoing objective, the following technical solutions are used in the embodiments of this application.

According to a first aspect of the embodiments of this application, a time synchronization method is provided. The method includes: A terminal UE receives a system information block SIB sent by a distributed unit DU, where the SIB is generated by the DU, the SIB includes time information, and the time information indicates a moment corresponding to a boundary of a system frame number SFN at which an end boundary of a system information SI window for sending the SIB is located, or indicates a moment corresponding to a boundary of an SFN immediately after an end boundary of an SI window for sending the SIB. The UE processes the time information to obtain a time reference. Based on this solution, by receiving the SIB that includes the time information and that is sent by the DU, the UE can learn of the moment that is indicated by the time information and that is corresponding to the boundary of the SFN, obtain the time reference based on the time information, and notify an upper layer of the time reference, so that time synchronization can be performed based on the time reference. Therefore, time synchronization between terminals can be implemented in a DU-CU split architecture.

With reference to the first aspect, in a possible implementation, if the SIB further includes the time information and a reference SFN corresponding to the time information, the time information indicates a moment corresponding to a boundary of the reference SFN. Based on this solution, the SIB received by the UE may further include the time information and the reference SFN corresponding to the time information, so that the UE can learn of, based on the SIB, the moment that is corresponding to the boundary of the reference SFN and that is indicated by the time information.

With reference to the first aspect and the foregoing possible implementation, in another possible implementation, the method further includes: The UE notifies an upper layer of the time reference. Based on this solution, the UE may send a time reference received by the RRC layer to a layer (for example, a NAS layer or an application layer) above an RRC layer, to implement time synchronization.

According to a second aspect of the embodiments of this application, a time synchronization method is provided. The method includes: A distributed unit DU generates a system information block SIB, where the SIB includes time information, and the time information indicates a moment corresponding to a boundary of a system frame number SFN at which an end boundary of a system information SI window for sending the SIB is located, or indicates a moment corresponding to a boundary of an SFN immediately after an end boundary of an SI window for sending the SIB. The DU sends the SIB to a terminal UE. Based on this solution, the DU generates the SIB including the time information, and sends the SIB to the UE in a broadcast manner, so that the UE learns of the correspondence between the time and the SFN based on the SIB. Therefore, time synchronization between terminals in a cell can be implemented in a DU-CU split architecture.

With reference to the second aspect, in a possible implementation, if the SIB further includes the time information and a reference SFN corresponding to the time information, the time information indicates a moment corresponding to a boundary of the reference SFN. Based on this solution, the DU may generate the SIB including the time information and the reference SFN corresponding to the time information, where the time information indicates the moment corresponding to the boundary of the reference SFN.

With reference to the second aspect and the foregoing possible implementation, in another possible implementation, that the DU sends the SIB to UE includes: The DU sends the SIB in the SI window. Based on this solution, the DU sends the SIB in the SI window, to notify, in a broadcast manner, the UE of the moment corresponding to the boundary of the reference SFN. It may be understood that, if the SIB includes the time information but does not include the reference SFN, the reference SFN is the SFN at which the end boundary of the system information SI window for sending the SIB is located, or the SFN immediately after the end boundary of the SI window for sending the SIB, and the time information in the SIB indicates the moment corresponding to the boundary of the reference SFN. If the SIB includes the time information and the reference SFN, the time information indicates the moment corresponding to the boundary of the reference SFN.

With reference to the second aspect and the foregoing possible implementations, in another possible implementation, the method further includes: The DU determines the time information, where a time unit of the time information is microsecond, nanosecond, femtosecond, or millisecond. Based on this solution, the DU obtains and determines high-precision time information, to ensure relatively precise time synchronization between terminals.

According to a third aspect of the embodiments of this application, a time synchronization method is provided. The method includes: A distributed unit DU determines time information and a reference system frame number SFN corresponding to the time information, where the time information indicates a moment corresponding to a boundary of the reference SFN. The DU sends the time information and the reference SFN to a centralized unit CU. Based on this solution, the DU determines the time information and the reference SFN, and sends the time information and the reference SFN to the CU, so that the CU can determine the correspondence between the time and the reference SFN based on information sent by the DU, and does not need to maintain the SFN number like the DU.

With reference to the third aspect, in a possible implementation, the method further includes: The DU generates a system information block SIB, where the SIB includes the time information and the reference SFN. Correspondingly, that the DU sends the time information and the reference SFN to the CU includes: The DU sends the SIB to the CU. Based on this solution, the DU generates the SIB, and sends the SIB to the CU, to assist the CU in obtaining a correspondence between the time information and the reference SFN.

With reference to the third aspect and the foregoing possible implementation, in another possible implementation, the time information and the reference SFN are sent in one information element, or are sent in two information elements. Based on this solution, the DU may simultaneously send the time information and the reference SFN, or may separately send the time information and the reference SFN.

With reference to the third aspect and the foregoing possible implementations, in another possible implementation, the method further includes: The DU determines the time information, where a time unit of the time information is microsecond, nanosecond, femtosecond, or millisecond. Based on this solution, the DU determines high-precision time information, to ensure relatively precise time synchronization between terminals.

With reference to the third aspect and the foregoing possible implementations, in another possible implementation, the DU receives a request message sent by the CU, where the request message is used to request the time information and the reference SFN corresponding to the time information. Based on this solution, after receiving the request sent by the CU, the DU sends the correspondence between the time information and the reference SFN to the CU.

According to a fourth aspect of the embodiments of this application, a time synchronization method is provided. The method includes: A centralized unit CU receives time information and a reference system frame number SFN corresponding to the time information that are sent by a distributed unit DU, where the time information indicates a moment corresponding to an end boundary of the reference SFN. The CU sends the time information and the reference SFN to a terminal. Based on this solution, the CU may receive a correspondence that is between the time information and the reference SFN and that is sent by the DU, and then send the time information and the reference SFN to the UE, so that time synchronization between terminals is implemented in a DU-CU split architecture.

With reference to the fourth aspect, in a possible implementation, that the CU sends the time information and the reference SFN to a terminal includes: The CU sends the time information and the reference SFN to the terminal by using dedicated signaling. Based on this solution, the CU may send the correspondence between the time information and the reference SFN to the UE by using the dedicated signaling.

With reference to the fourth aspect and the foregoing possible implementation, in another possible implementation, the method further includes: The CU sends a request message to the DU, where the request message is used to request the time information and the reference SFN. Based on this solution, the CU sends the request message to the DU, to obtain the time information and the reference SFN corresponding to the time information.

With reference to the fourth aspect and the foregoing possible implementations, in another possible implementation, the method further includes: The CU determines the time information. The CU performs time synchronization with the DU based on the time information. Based on this solution, time synchronization can be performed with the DU by using the time information determined by the CU, so that after receiving the time information and the reference SFN that are sent by the DU, the CU and the DU can maintain SFNs synchronously.

According to a fifth aspect of the embodiments of this application, a time synchronization method is provided. The method includes: A centralized unit CU determines time information and a reference system frame number SFN corresponding to the time information, where the time information indicates a moment corresponding to an end boundary of the reference SFN. The CU sends the time information and the reference SFN to a distributed unit DU. Based on this solution, the CU determines the time information and the reference SFN, and sends the time information and the reference SFN to the DU, to assist the DU in obtaining a correspondence between the time information and the reference SFN.

With reference to the fifth aspect and the foregoing possible implementation, in another possible implementation, the method further includes: The CU generates a system information block SIB, where the SIB includes the time information and the reference SFN. Correspondingly, that the CU sends the time information and the reference SFN to the DU includes: The CU sends the SIB to the DU. Based on this solution, the CU sends the SIB to the DU, to assist the DU in obtaining the correspondence between the time information and the reference SFN.

According to a sixth aspect of the embodiments of this application, a time synchronization method is provided. The method includes: A centralized unit CU determines time information and a system frame number SFN corresponding to the time information, where the time information indicates a moment corresponding to an end boundary of the reference SFN. The CU sends the time information and the reference SFN to a terminal. Based on this solution, the CU may autonomously maintain the SFN, and send the correspondence between the time and the reference SFN to the terminal, so that time synchronization between terminals in a cell can be implemented in a CU-DU split architecture.

With reference to the sixth aspect, in a possible implementation, that the CU sends the time information and the reference SFN to a terminal includes: The CU sends the time information and the reference SFN to the terminal by using dedicated signaling. Based on this solution, the CU may send the correspondence between the time information and the reference SFN to the UE by using the dedicated signaling.

According to a seventh aspect of the embodiments of this application, a time synchronization method is provided. The method includes: A distributed unit DU receives system information block SIB sent by a centralized unit CU, where the SIB includes time information and a reference system frame number SFN corresponding to the time information, and the time information indicates a moment corresponding to an end boundary of the reference SFN. The DU sends the SIB to a terminal UE. Based on this solution, the DU obtains a correspondence between the time information and the reference SFN through assistance of the CU, and then broadcasts the correspondence to the terminal, to implement time synchronization between terminals.

According to an eighth aspect of the embodiments of this application, a time synchronization method is provided. The method includes: A distributed unit DU receives time information and a reference system frame number SFN corresponding to the time information that are sent by a centralized unit CU, and the time information indicates a moment corresponding to an end boundary of the reference SFN. The DU generates a system information block SIB, where the SIB includes the time information and the reference SFN. The DU sends the SIB to a terminal UE. Based on this solution, the DU obtains a correspondence between the time information and the reference SFN through assistance of the CU, and then broadcasts the correspondence to the terminal, to implement time synchronization between terminals.

With reference to the fifth aspect or the sixth aspect, in a possible implementation, the method further includes: The CU determines the time information, where a time unit of the time information is microsecond, nanosecond, femtosecond, or millisecond. Based on this solution, the CU determines high-precision time information, to ensure relatively precise time synchronization between terminals.

With reference to the fifth aspect, the sixth aspect, the seventh aspect, or the eighth aspect, in a possible implementation, a time of the CU is synchronized with a time of the DU, and a system frame number SFN of the CU is synchronized with a system frame number SFN of the DU. Based on this solution, the CU and the DU can maintain SFNs synchronously.

With reference to the first aspect, the second aspect, the third aspect, the fifth aspect, the seventh aspect, or the eighth aspect, in a possible implementation, the SIB is a SIB16, a SIB9, or a newly added SIB. Based on this solution, in a current technology, a DU can generate only a MIB and a SIB1, and a CU can generate a SIB16 and a SIB9. However, in this solution, the DU or the CU can generate the SIB16, the SIB9, or the newly added SIB, so that time synchronization between terminals can be implemented in a DU-CU split architecture. It may be understood that the newly added SIB is an SIB other than an SIB specified in an existing protocol. For example, in an NR system, the newly added SIB may be an SIB other than a SIB1 to a SIB9 that are specified in the TS38.331 protocol. In an LTE system, the newly added SIB may be an SIB other than a SIB1 to a SIB26 that are specified in the TS36.331 protocol.

With reference to the first aspect, the seventh aspect, or the eighth aspect, in a possible implementation, a time unit of the time information is microsecond, nanosecond, femtosecond, or millisecond. Based on this solution, high-precision time information can be used to ensure relatively precise time synchronization between terminals.

According to a ninth aspect of the embodiments of this application, a time synchronization method is provided. The method includes: A first base station determines first time information of a first cell, where a unit of the first time information meets preset precision, and the first cell is a cell served by the first base station. The first base station sends the first time information and a first reference SFN corresponding to the first time information to a second base station, where the first time information indicates a moment corresponding to a boundary of the first reference SFN. The second base station receives the first time information and the first reference SFN. The second base station determines second time information and a second reference SFN that are of a second cell based on the first time information and the first reference SFN, where the second time information indicates a moment corresponding to a boundary of the second reference SFN. The second base station sends the second time information and the second reference SFN to a terminal UE. Based on this solution, a correspondence between time information and a reference SFN that are of a cell of the base station can be determined by using a correspondence between the reference SFN and time information obtained by another base station from a clock source, to implement time synchronization between terminals in the cell of the base station. This reduces costs of obtaining the time information from the clock source by the base station.

With reference to the ninth aspect, in a possible implementation, that the second base station determines second time information and a second reference SFN that are of a second cell based on the first time information and the first reference SFN includes: The second base station determines an SFN deviation and an intra-frame deviation between the first cell and the second cell. The second base station determines the second time information and the second SFN based on the SFN deviation, the intra-frame deviation, the first time information, and the first reference SFN. Based on this solution, the second base station may determine a correspondence between the second time information and the second reference SFN based on the first time information and the first reference SFN, and with reference to the SFN deviation and the intra-frame deviation between the two cells.

According to a tenth aspect of the embodiments of this application, a terminal UE is provided. The UE includes: a receiving unit, configured to receive a system information block SIB sent by a distributed unit DU, where the SIB is generated by the DU, the SIB includes time information, and the time information indicates a moment corresponding to a boundary of a system frame number SFN at which an end boundary of a system information SI window for sending the SIB is located, or indicates a moment corresponding to a boundary of an SFN immediately after an end boundary of an SI window for sending the SIB; and a processing unit, configured to process the time information to obtain a time reference.

With reference to the tenth aspect, in a possible implementation, if the SIB further includes the time information and a reference SFN corresponding to the time information, the time information indicates a moment corresponding to a boundary of the reference SFN.

With reference to the tenth aspect and the foregoing possible implementation, in another possible implementation, the UE further includes a sending unit. The sending unit is configured to notify an upper layer of the time reference.

According to an eleventh aspect of the embodiments of this application, a time synchronization apparatus is provided. The apparatus includes: a processing unit, configured to generate a system information block SIB, where the SIB includes time information, and the time information indicates a moment corresponding to a boundary of a system frame number SFN at which an end boundary of a system information SI window for sending the SIB is located, or indicates a moment corresponding to a boundary of an SFN immediately after an end boundary of an SI window for sending the SIB; and a sending unit, configured to send the SIB to a terminal UE.

With reference to the eleventh aspect, in a possible implementation, if the SIB further includes the time information and a reference SFN corresponding to the time information, the time information indicates a moment corresponding to a boundary of the reference SFN.

With reference to the eleventh aspect and the foregoing possible implementation, in another possible implementation, the sending unit is specifically configured to send the SIB in the SI window.

With reference to the eleventh aspect and the foregoing possible implementations, in another possible implementation, the processing unit is further configured to determine the time information, where a time unit of the time information is microsecond, nanosecond, femtosecond, or millisecond.

According to a twelfth aspect of the embodiments of this application, a time synchronization apparatus is provided. The apparatus includes: a processing unit, configured to determine time information and a reference system frame number SFN corresponding to the time information, where the time information indicates a moment corresponding to a boundary of the reference SFN; and a sending unit, configured to send the time information and the reference SFN to a centralized unit CU.

With reference to the twelfth aspect, in a possible implementation, the processing unit is further configured to generate a system information block SIB, where the SIB includes the time information and the reference SFN. The sending unit is specifically configured to send the SIB to the CU.

With reference to the twelfth aspect and the foregoing possible implementation, in another possible implementation, the time information and the reference SFN are sent in one information element, or are sent in two information elements.

With reference to the twelfth aspect and the foregoing possible implementations, in another possible implementation, the processing unit is further configured to determine the time information, where a time unit of the time information is microsecond, nanosecond, femtosecond, or millisecond.

With reference to the twelfth aspect and the foregoing possible implementations, in another possible implementation, the apparatus further includes a receiving unit. The receiving unit is configured to receive a request message sent by the CU, where the request message is used to request the time information and the reference SFN corresponding to the time information.

According to a thirteenth aspect of the embodiments of this application, a time synchronization apparatus is provided. The apparatus includes: a receiving unit, configured to receive time information and a reference system frame number SFN corresponding to the time information that are sent by a distributed unit DU, where the time information indicates a moment corresponding to an end boundary of the reference SFN; and a sending unit, configured to send the time information and the reference SFN to a terminal.

With reference to the thirteenth aspect, in a possible implementation, the sending unit is specifically configured to send the time information and the reference SFN to the terminal by using dedicated signaling.

With reference to the thirteenth aspect and the foregoing possible implementation, in another possible implementation, the sending unit is further configured to send a request message to the DU, where the request message is used to request the time information and the reference SFN.

With reference to the thirteenth aspect and the foregoing possible implementations, in another possible implementation, the apparatus further includes a processing unit. The processing unit is configured to: determine the time information, and perform time synchronization with the DU based on the time information.

According to a fourteenth aspect of the embodiments of this application, a time synchronization apparatus is provided. The apparatus includes: a processing unit, configured to determine time information and a reference system frame number SFN corresponding to the time information, where the time information indicates a moment corresponding to an end boundary of the reference SFN; and a sending unit, configured to send the time information and the reference SFN to a distributed unit DU.

With reference to the fourteenth aspect and the foregoing possible implementation, in another possible implementation, the processing unit is further configured to generate a system information block SIB, where the SIB includes the time information and the reference SFN. Correspondingly, the sending unit is further configured to send the SIB to the DU.

According to a fifteenth aspect of the embodiments of this application, a time synchronization apparatus is provided. The apparatus includes: a processing unit, configured to determine time information and a system frame number SFN corresponding to the time information, where the time information indicates a moment corresponding to an end boundary of the reference SFN; and a sending unit, configured to send the time information and the reference SFN to a terminal.

With reference to the fifteenth aspect, in a possible implementation, the sending unit is specifically configured to send the time information and the reference SFN to the terminal by using dedicated signaling.

According to a sixteenth aspect of the embodiments of this application, a time synchronization apparatus is provided. The apparatus includes: a receiving unit, configured to receive system information block SIB sent by a centralized unit CU, where the SIB includes time information and a reference system frame number SFN corresponding to the time information, and the time information indicates a moment corresponding to an end boundary of the reference SFN; and a sending unit, configured to send the SIB to a terminal UE.

According to a seventeenth aspect of the embodiments of this application, a time synchronization apparatus is provided. The apparatus includes: a receiving unit, configured to receive time information and a reference system frame number SFN corresponding to the time information that are sent by a centralized unit CU, where the time information indicates a moment corresponding to an end boundary of the reference SFN; a processing unit, configured to generate a system information block SIB, where the SIB includes the time information and the reference SFN; and a sending unit, configured to send the SIB to a terminal UE.

With reference to the sixteenth aspect or the seventeenth aspect, in a possible implementation, the sending unit is specifically configured to send the SIB in a system information SI window.

With reference to the thirteenth aspect or the fourteenth aspect, in a possible implementation, the processing unit is further configured to determine the time information, where a time unit of the time information is microsecond, nanosecond, femtosecond, or millisecond.

With reference to the fourteenth aspect, the fifteenth aspect, the sixteenth aspect, or the seventeenth aspect, in a possible implementation, a time of the CU is synchronized with a time of the DU, and a system frame number SFN of the CU is synchronized with a system frame number SFN of the DU.

With reference to the tenth aspect, the eleventh aspect, the twelfth aspect, the fourteenth aspect, the sixteenth aspect, or the seventeenth aspect, in a possible implementation, the SIB is a SIB16, a SIB9, or a newly added SIB.

With reference to the tenth aspect, the sixteenth aspect, or the seventeenth aspect, in a possible implementation, a time unit of the time information is microsecond, nanosecond, femtosecond, or millisecond.

According to an eighteenth aspect of the embodiments of this application, a terminal UE is provided. The UE includes: a receiver, configured to receive a system information block SIB sent by a distributed unit DU, where the SIB is generated by the DU, the SIB includes time information, and the time information indicates a moment corresponding to a boundary of a system frame number SFN at which an end boundary of a system information SI window for sending the SIB is located, or indicates a moment corresponding to a boundary of an SFN immediately after an end boundary of an SI window for sending the SIB; and a processor, configured to process the time information to obtain a time reference.

With reference to the eighteenth aspect, in a possible implementation, if the SIB further includes the time information and a reference SFN corresponding to the time information, the time information indicates a moment corresponding to a boundary of the reference SFN.

With reference to the eighteenth aspect and the foregoing possible implementation, in another possible implementation, the UE further includes a transmitter. The transmitter is configured to notify an upper layer of the time reference.

According to a nineteenth aspect of the embodiments of this application, a time synchronization apparatus is provided. The apparatus includes: a processor, configured to generate a system information block SIB, where the SIB includes time information, and the time information indicates a moment corresponding to a boundary of a system frame number SFN at which an end boundary of a system information SI window for sending the SIB is located, or indicates a moment corresponding to a boundary of an SFN immediately after an end boundary of an SI window for sending the SIB; and a transmitter, configured to send the SIB to a terminal UE.

With reference to the nineteenth aspect, in a possible implementation, if the SIB further includes the time information and a reference SFN corresponding to the time information, the time information indicates a moment corresponding to a boundary of the reference SFN.

With reference to the nineteenth aspect and the foregoing possible implementation, in another possible implementation, the transmitter is specifically configured to send the SIB in the SI window.

With reference to the nineteenth aspect and the foregoing possible implementations, in another possible implementation, the processor is further configured to determine the time information, where a time unit of the time information is microsecond, nanosecond, femtosecond, or millisecond.

According to a twentieth aspect of the embodiments of this application, a time synchronization apparatus is provided. The apparatus includes: a processor, configured to determine time information and a reference system frame number SFN corresponding to the time information, where the time information indicates a moment corresponding to a boundary of the reference SFN; and a transmitter, configured to send the time information and the reference SFN to a centralized unit CU.

With reference to the twentieth aspect, in a possible implementation, the processor is further configured to generate a system information block SIB, where the SIB includes the time information and the reference SFN. The transmitter is specifically configured to send the SIB to the CU.

With reference to the twentieth aspect and the foregoing possible implementation, in another possible implementation, the time information and the reference SFN are sent in one information element, or are sent in two information elements.

With reference to the twentieth aspect and the foregoing possible implementations, in another possible implementation, the processor is further configured to determine the time information, where a time unit of the time information is microsecond, nanosecond, femtosecond, or millisecond.

With reference to the twentieth aspect and the foregoing possible implementations, in another possible implementation, the apparatus further includes a receiver. The receiver is configured to receive a request message sent by the CU, where the request message is used to request the time information and the reference SFN corresponding to the time information.

According to a twenty-first aspect of the embodiments of this application, a time synchronization apparatus is provided. The apparatus includes: a receiver, configured to receive time information and a reference system frame number SFN corresponding to the time information that are sent by a distributed unit DU, where the time information indicates a moment corresponding to an end boundary of the reference SFN; and a transmitter, configured to send the time information and the reference SFN to a terminal.

With reference to the twenty-first aspect, in a possible implementation, the transmitter is specifically configured to send the time information and the reference SFN to the terminal by using dedicated signaling.

With reference to the twenty-first aspect and the foregoing possible implementation, in another possible implementation, the transmitter is further configured to send a request message to the DU, where the request message is used to request the time information and the reference SFN.

With reference to the twenty-first aspect and the foregoing possible implementations, in another possible implementation, the apparatus further includes a processor. The processor is configured to: determine the time information, and perform time synchronization with the DU based on the time information.

According to a twenty-second aspect of the embodiments of this application, a time synchronization apparatus is provided. The apparatus includes: a processor, configured to determine time information and a reference system frame number SFN corresponding to the time information, where the time information indicates a moment corresponding to an end boundary of the reference SFN; and a transmitter, configured to send the time information and the reference SFN to a distributed unit DU.

With reference to the twenty-second aspect and the foregoing possible implementation, in another possible implementation, the processor is further configured to generate a system information block SIB, where the SIB includes the time information and the reference SFN. Correspondingly, the transmitter is further configured to send the SIB to the DU.

According to a twenty-third aspect of the embodiments of this application, a time synchronization apparatus is provided. The apparatus includes: a processor, configured to determine time information and a system frame number SFN corresponding to the time information, where the time information indicates a moment corresponding to an end boundary of the reference SFN; and a transmitter, configured to send the time information and the reference SFN to a terminal.

With reference to the twenty-third aspect, in a possible implementation, the transmitter is specifically configured to send the time information and the reference SFN to the terminal by using dedicated signaling.

According to a twenty-fourth aspect of the embodiments of this application, a time synchronization apparatus is provided. The apparatus includes: a receiver, configured to receive system information block SIB sent by a centralized unit CU, where the SIB includes time information and a reference system frame number SFN corresponding to the time information, and the time information indicates a moment corresponding to an end boundary of the reference SFN; and a transmitter, configured to send the SIB to a terminal UE.

According to a twenty-fifth aspect of the embodiments of this application, a time synchronization apparatus is provided. The apparatus includes: a receiver, configured to receive time information and a reference system frame number SFN corresponding to the time information that are sent by a centralized unit CU, where the time information indicates a moment corresponding to an end boundary of the reference SFN; a processor, configured to generate a system information block SIB, where the SIB includes the time information and the reference SFN; and a transmitter, configured to send the SIB to a terminal UE.

With reference to the twenty-fourth aspect or the twenty-fifth aspect, in a possible implementation, the transmitter is specifically configured to send the SIB in a system information SI window.

With reference to the twenty-fourth aspect or the twenty-fifth aspect, in a possible implementation, the transmitter is specifically configured to send the SIB in a system information SI window.

With reference to the twenty-first aspect or the twenty-second aspect, in a possible implementation, the processing unit is further configured to determine the time information, where a time unit of the time information is microsecond, nanosecond, femtosecond, or millisecond.

With reference to the twenty-second aspect, the twenty-third aspect, the twenty-fourth aspect, or the twenty-fifth aspect, in a possible implementation, a time of the CU is synchronized with a time of the DU, and a system frame number SFN of the CU is synchronized with a system frame number SFN of the DU.

With reference to the eighteenth aspect, the nineteenth aspect, the twentieth aspect, the twenty-second aspect, the twenty-fourth aspect, or the twenty-fifth aspect, in a possible implementation, the SIB is a SIB16, a SIB9, or a newly added SIB.

With reference to the eighteenth aspect, the twenty-fourth aspect, or the twenty-fifth aspect, in a possible implementation, a time unit of the time information is microsecond, nanosecond, femtosecond, or millisecond.

For descriptions of effects of the various implementations of the tenth aspect to the twenty-fifth aspect, refer to descriptions of corresponding effects of the various implementations of the first aspect to the eighth aspect. Details are not described herein again.

According to a twenty-sixth aspect of the embodiments of this application, a computer storage medium is provided. The computer storage medium stores computer program code. When the computer program code is run on a processor, the processor is enabled to perform the time synchronization method according to any one of the foregoing aspects.

According to a twenty-seventh aspect of the embodiments of this application, a computer program product is provided. The program product stores computer software instructions executed by the foregoing processor. The computer software instructions include a program used to perform the solutions in the foregoing aspects.

According to a twenty-eighth aspect of the embodiments of this application, a time synchronization apparatus is provided. The apparatus exists in a product form of a chip. A structure of the apparatus includes a processor and a memory. The memory is configured to: be coupled to the processor, and store program instructions and data that are necessary for the apparatus. The processor is configured to execute the program instructions stored in the memory, so that the apparatus performs a function of the apparatus in the foregoing methods.

DESCRIPTION OF EMBODIMENTS

Embodiments of this application provide a time synchronization method. The method is applicable to an architecture in which a centralized unit CU and a distributed unit DU are separated from each other. The CU-DU split architecture may be an architecture in a long term evolution (LTE) system, or may be an architecture in a 5G new radio (NR) system. This is not limited in the embodiments of this application.

In the CU-DU split architecture, the CU may be configured to: receive data, a request message, and the like that are reported by a terminal; generate a system information block (SIB), radio resource control (RRC) dedicated signaling, and system broadcast signaling; and send the SIB, the RRC dedicated signaling, and the system broadcast signaling to the UE via the DU. The DU may be configured to: generate a MIB and a SIB, and send the MIB and the SIB to the terminal; receive service data, system broadcast, dedicated signaling, or the like from the CU, and send the service data, the system broadcast, the dedicated signaling, or the like to the terminal.

Figure 1:
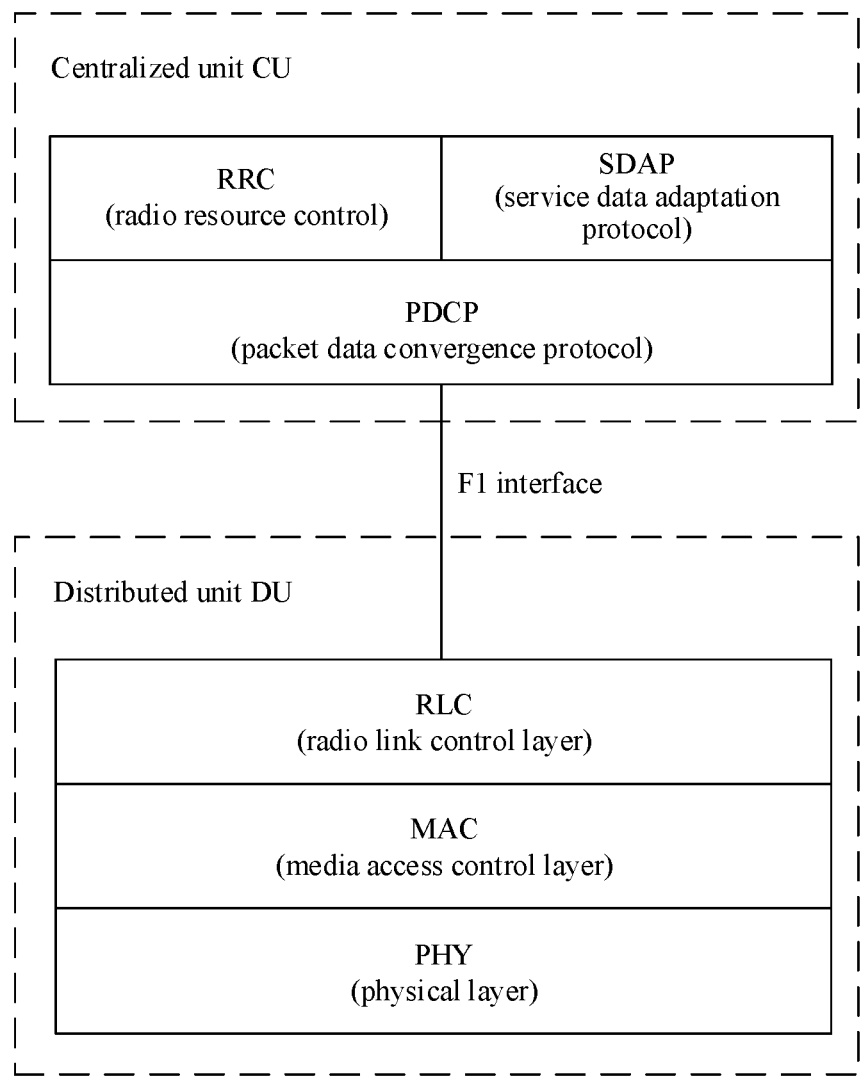
FIG. 1 is a schematic diagram of a CU-DU split architecture according to an embodiment of this application.
Figure 2:
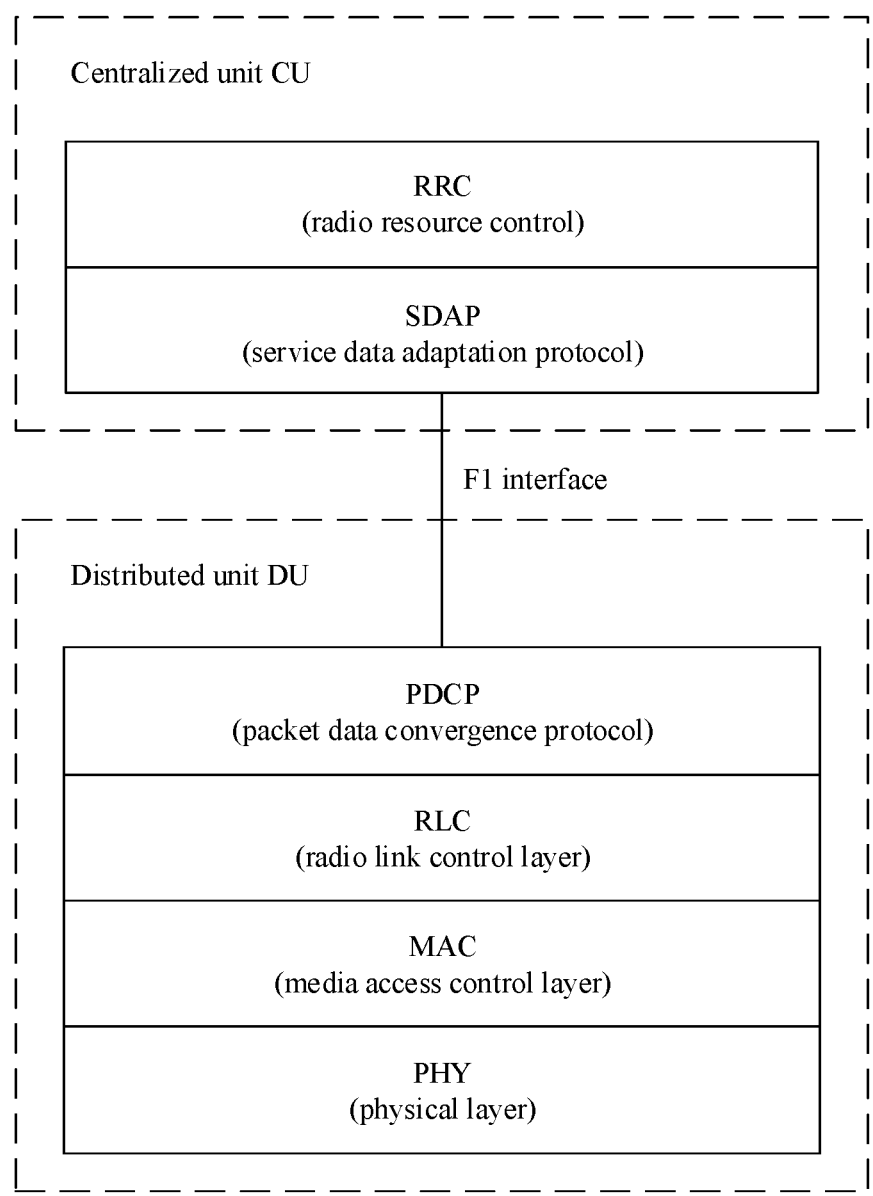
FIG. 2 is a schematic diagram of another CU-DU split architecture according to an embodiment of this application.

For example, in the CU-DU split architecture, the CU and the DU may be divided based on protocol layers of a wireless network. For example, as shown in FIG. 1, a possible division manner is as follows: The CU is configured to perform functions of a radio resource control RRC protocol stack, a service data adaptation protocol (SDAP) protocol stack, and a packet data convergence protocol (PDCP) layer, and the DU is configured to perform functions of a radio link control (RLC) layer, a media access control (MAC) layer, a physical layer, and the like. As shown in FIG. 2, another possible division manner is as follows: The CU is configured to perform functions of an RRC protocol stack and an SDAP protocol stack, and the DU is configured to perform functions of a PDCP layer, an RLC layer, a MAC layer, a physical layer, and the like. It may be understood that the schematic diagrams of the CU-DU split architectures shown in FIG. 1 and FIG. 2 are merely descriptions of examples of division based on the protocol layers. A specific division manner of the CU-DU split architecture is not limited in the embodiments of this application.

It may be understood that, division of processing functions of the CU and the DU based on the protocol layers is merely an example, and the processing functions of the CU and the DU may alternatively be divided in another manner. For example, the CU or the DU may be divided to have functions of more protocol layers. For example, the CU or the DU may alternatively be divided to have some processing functions of protocol layers. In a design, some functions of the RLC layer and a function of a protocol layer above the RLC layer are distributed to the CU, and a remaining function of the RLC layer and a function of a protocol layer below the RLC layer are distributed to the DU. In another design, functions of the CU or the DU may alternatively be divided based on a service type or another system requirement. For example, division is performed based on a delay. Functions whose processing time needs to meet a delay requirement are distributed to the DU, and functions that do not need to meet the delay requirement are distributed to the CU. In another design, the CU may alternatively have one or more functions of a core network. One or more CUs may be disposed in a centralized manner or a separated manner. For example, the CUs may be disposed on a network side for centralized management. The DU may have a plurality of radio frequency functions, and the radio frequency functions may be remotely set. This is not limited in the embodiments of this application.

Figure 3:
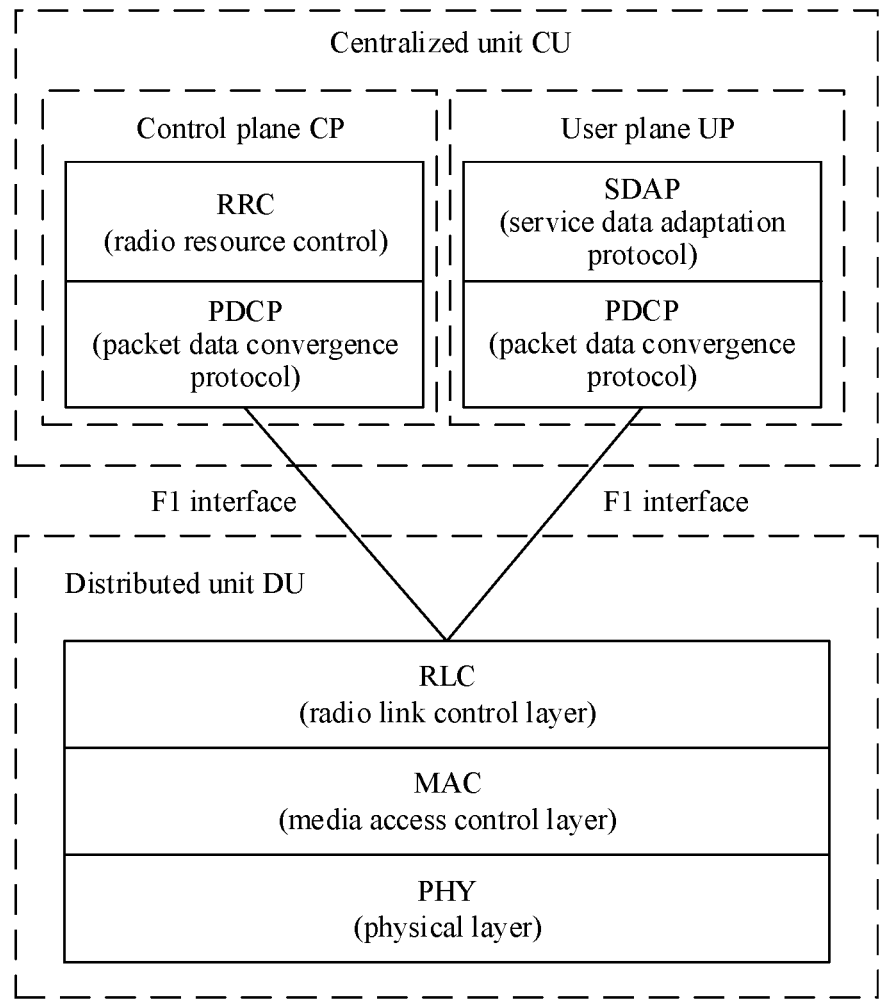
FIG. 3 is a schematic diagram of another CU-DU split architecture according to an embodiment of this application.

For example, functions of the CU may be implemented by one entity, or may be implemented by different entities. For example, as shown in FIG. 3, the functions of the CU may be further divided. A control plane (CP) and a user plane (UP), namely, a control plane of the CU (CU-CP) and a user plane of the CU (CU-UP), are separated from each other. The CU-CP and the CU-UP may be implemented by different functional entities. The CU-CP and the CU-UP may be coupled to the DU to jointly implement functions of a base station.

For example, the CU and the DU may be connected through an interface, for example, an F1 interface.

It may be understood that the CU-DU split architectures shown in FIG. 1 and FIG. 3 are merely examples for description. Specific composition of the CU-DU split architecture is not limited in the embodiments of this application. Herein, only FIG. 1 to FIG. 3 are used as examples for description.

To resolve a problem in the background that time synchronization between terminals cannot be implemented by using a current technology when a CU and a DU are separated from each other, an embodiment of this application provides a time synchronization method.

It should be noted that a boundary of a system frame number (SFN) in the following embodiments of this application may be a frame header boundary of the SFN, or may be a frame trailer boundary of the SFN. This is not limited in the embodiments of this application.

Figure 4:
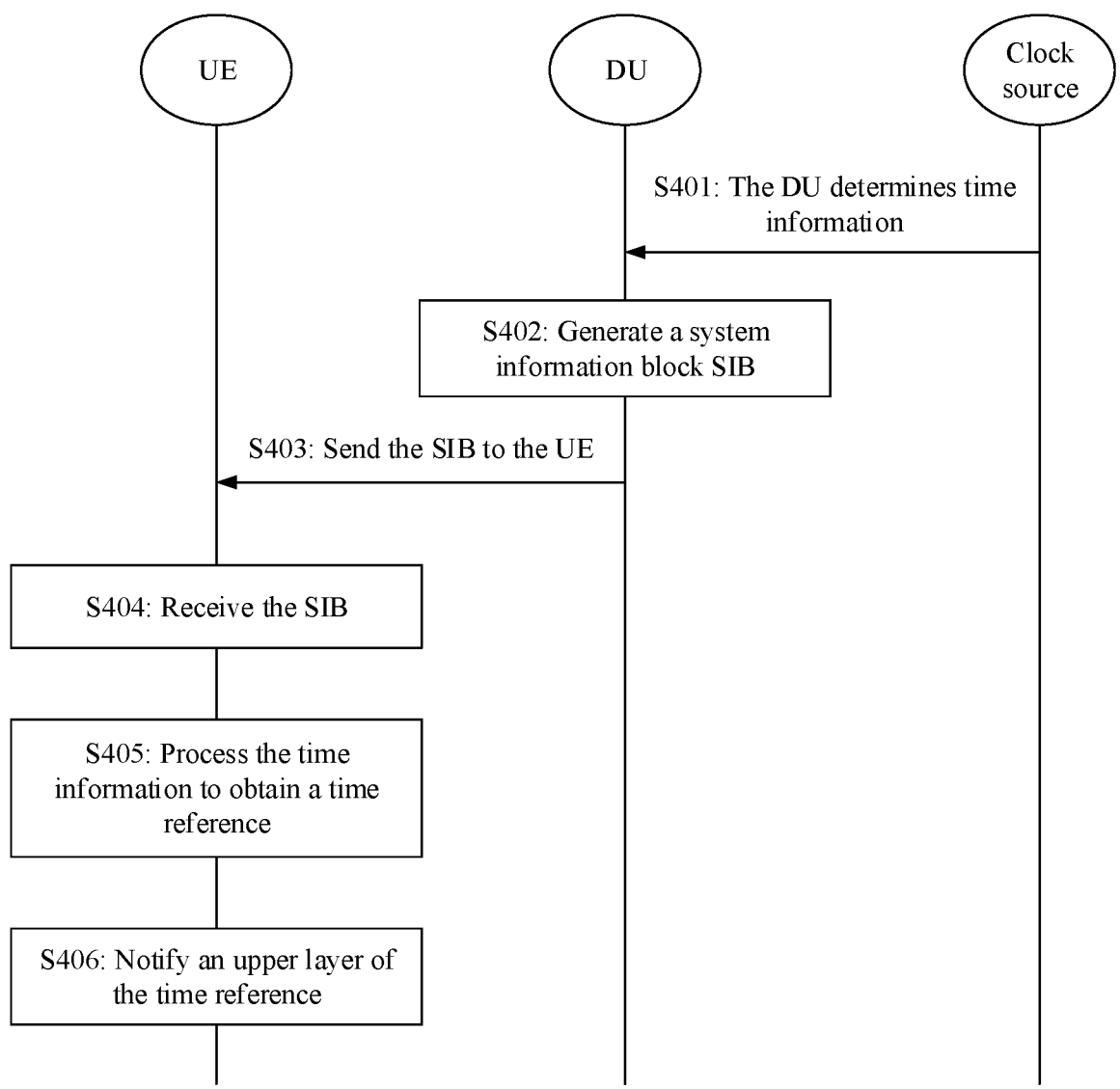
FIG. 4 is a flowchart of a time synchronization method according to an embodiment of this application.

With reference to FIG. 1 to FIG. 3, as shown in FIG. 4, an embodiment of this application provides a time synchronization method. The method includes steps S401 to S406.

S401: A DU determines time information.

For example, a time unit of the time information meets preset precision. For example, the time unit of the time information may be millisecond, microsecond, femtosecond, nanosecond, or another time unit of a smaller order of magnitude. For example, the time unit of the time may be n microseconds, n nanoseconds, n femtoseconds, or n milliseconds, where n is greater than 0. When the time unit is n milliseconds, a value of n is less than 10. A specific precision level of the time unit of the time information is not limited in this embodiment of this application, and descriptions herein are merely examples. For example, the time information may be 11 o'clock, 10 minutes, 5 seconds, 10 milliseconds, 20 microseconds, and 15 nanoseconds on the eleventh day. Optionally, the time information may be a first value relative to a reference time, where the first value may include values of a plurality of parameters, and the plurality of parameters may be corresponding to different time units.

For example, the time information may be a time relative to a preset time or reference time.

For example, the time information may be a global positioning system (GPS) time obtained by the DU from a clock source, and the GPS time is a time relative to a GPS start time (preset time). For example, the GPS start time point may be 00:00:00 on Gregorian calendar date Jan. 6, 1980. The time information may alternatively be a local time obtained by the DU from a clock source, and the local time is a time relative to a local start time (preset time). A value of the local start time point depends on implementation of an upper layer. For example, the value can be determined based on a local clock of a synchronization clock source.

For example, that a DU determines time information may include: The DU obtains a GPS time from a clock source, and subtracts leap seconds from the GPS time to obtain a coordinated universal time (UTC). In this case, the preset time may be a start time point of the UTC time, for example, 00:00:00 on Gregorian calendar date Jan. 1, 1900 (at the midnight on Sunday, Dec. 31, 1899, and Monday, Jan. 1, 1900). It should be noted that a specific manner of determining the time information by the DU is not limited in this embodiment of this application, and descriptions herein are merely examples. For example, the DU may obtain the GPS time from the clock source through the precision time protocol (PTP) of 1588 or 802.1as, and then determine the UTC time based on the GPS time. For example, a clock synchronization functional entity in the DU may exchange a PTP message with a server of the clock source, to obtain the time information.

For example, in addition to information about the UTC time, GPS time, or local time, the time information may further include one or more of time type information, compensation information, an offset between the UTC time and the local time, a leap second offset between the GPS time and the UTC time, other uncertain time information, or whether and how to apply a daylight saving time. Specific content included in the time information is not limited in the embodiments of this application. For example, the time information may include the GPS time and a leap second time, so that a terminal calculates the UTC time based on the GPS time and the leap second time. The time information may alternatively include the UTC time and a leap second time, so that the terminal calculates the GPS time based on the UTC time and the leap second time.

Optionally, the time information in step S401 may include a plurality of times, and each of the plurality of times may include identifier information of one clock domain.

Optionally, each of the plurality of times may be an offset relative to a reference time. For example, a time may be an offset relative to the GPS time, the UTC time, or the local time. It may be understood that the DU may send a GPS time, a UTC time, or a local time to the terminal, and time information of another local time is a difference relative to the GPS time, the UTC time, or the local time. For example, the time information may include a GPS time (11 o'clock, 10 minutes, 5 seconds, 10 milliseconds, 20 microseconds, and 15 nanoseconds on the eleventh day), and may further include 50 microseconds and 100 microseconds. The 50 microseconds are an offset relative to the GPS time (11 o'clock, 10 minutes, 5 seconds, 10 milliseconds, 20 microseconds, and 15 nanoseconds on the eleventh day). 11 o'clock, 10 minutes, 5 seconds, 10 milliseconds, 20 microseconds, and 15 nanoseconds on the eleventh day may be combined with the 50 microseconds to obtain a local time (11 o'clock, 10 minutes, 5 seconds, 10 milliseconds, 70 microseconds, and 15 nanoseconds on the eleventh day).

S402: The DU generates a system information block SIB.

For example, in an implementation, the SIB includes the time information but does not include a reference system frame number (SFN), where the reference SFN is an SFN corresponding to the time information. In the first example of this implementation, if an end boundary of an SI window is aligned with a frame trailer of the SFN, the time information in the SIB indicates a moment corresponding to a boundary of an SFN at which an end boundary of the system information SI window for sending the SIB is located. If the end boundary of the SI window is not aligned with the frame trailer of the SFN, the time information in the SIB indicates a moment corresponding to a boundary of an SFN immediately after an end boundary of the SI window for sending the SIB. In the second example of this implementation, if a start boundary of the SI window is aligned with a frame header of the SFN, the time information in the SIB indicates a moment corresponding to a boundary of an SFN at which a start boundary of the system information SI window for sending the SIB is located. If the start boundary of the SI window is not aligned with the frame header of the SFN, the time information in the SIB indicates a moment corresponding to a boundary of an SFN immediately after a start boundary of an SI window for sending the SIB. In this embodiment of this application, a specific moment that is corresponding to the boundary of the SFN and that is indicated by the time information is not limited, and the time information only needs to be corresponding to a moment corresponding to a boundary of an SFN. In the following embodiments, only the foregoing first example is used as an example for description. It should be noted that, the SFN immediately after the end boundary of the SI window for sending the SIB may be a next SFN of the end boundary of the SI window for sending the SIB, or may be an $N^{th}$ SFN after the end boundary of the SI window for sending the SIB, where N is a natural number. This is not limited in this embodiment of this application. That the SFN immediately after the end boundary of the SI window for sending the SIB is a next SFN of the end boundary of the SI window for sending the SIB is used as an example for description below. For example, as shown in (a) in FIG. 5, if the SI window for sending the SIB is an SI window 1, the SFN immediately after the end boundary of the SI window 1 may be an SFN 100.

In another implementation, the SIB may include the time information and a reference SFN corresponding to the time information, where the time information indicates a moment corresponding to a boundary of the reference SFN.

It should be noted that the time information in the SIB may be directly obtained from the clock source, or may be calculated based on a time obtained by the DU from the clock source. For example, the time obtained by the DU from the clock source is a first time. If the first time is a moment corresponding to a boundary of the SFN 100, the DU may generate the SIB based on the first time and the SFN 100. If the first time is a time of an intermediate moment of the SFN 100, the DU may determine a second time based on the first time. The second time is obtained by adding 5 milliseconds to the first time. The second time is a moment corresponding to the boundary of the reference SFN (SFN 100). The DU then generates the SIB based on the second moment and the SFN 100. It may be understood that the second time may alternatively be another time obtained based on the first time, but the second time needs to indicate the moment corresponding to the boundary of the reference SFN.

For example, a type of the SIB may be a SIB16, a SIB9, or another newly added SIB, and the newly added SIB is a SIB other than a SIB specified in an existing protocol. For example, in an NR system, the newly added SIB may be an SIB other than a SIB1 to a SIB9 that are specified in the TS38.331 protocol. In an LTE system, the newly added SIB may be an SIB other than a SIB1 to a SIB26 that are specified in the TS36.331 protocol. In this embodiment of this application, a specific SIB generated by the DU is not limited, and descriptions herein are merely examples.

For example, in the LTE system, the DU may generate a SIB16. In an NR architecture, the DU may generate a SIB9. In the SIB9, the time information is added to the existing SIB9, or the time information and the reference SFN are added to the existing SIB9. In the LTE system or the NR architecture, the DU may alternatively generate the newly added SIB, which may be denoted as SIBX. The SIBX may include the time information but does not include the reference SFN, or may include the time information and the reference SFN. This is not limited in this embodiment of this application.

S403: The DU sends the SIB to a terminal UE.

For example, the DU may send the SIB including the time information to the UE by using a broadcast message. The UE may be all UEs in a cell. In other words, the DU may send the SIB to all the UEs in the cell in a broadcast manner. Optionally, the DU may send information about the SIB after receiving a request message of the UE.

For example, that the DU sends the SIB to the UE may include: The DU sends the SIB in a system information SI window. Specifically, the DU may send the SIB in the SI window of the reference SFN. It may be understood that, if the SIB includes the time information but does not include the reference SFN, the reference SFN is the SFN at which the end boundary of the system information SI window for sending the SIB is located, or the SFN immediately after the end boundary of the SI window for sending the SIB, and the time information in the SIB indicates the moment corresponding to the boundary of the reference SFN. If the SIB includes the time information and the reference SFN, the time information indicates the moment corresponding to the boundary of the reference SFN.

It may be understood that, if a UTC included in the time information is 11 o'clock, 10 minutes, 5 seconds, 10 milliseconds, 20 microseconds, and 15 nanoseconds on the eleventh day, and the time indicates the moment corresponding to the boundary of the SFN 100, the DU may determine, based on the time information, the moment corresponding to the boundary of the reference SFN. For example, if the reference SFN is the SFN 100, the moment corresponding to the boundary of the SFN 100 is the UTC time. If the reference SFN is an SFN 101, a moment corresponding to a boundary of the SFN 101 is a sum of the UTC time and a frame length of an SFN (10 ms).

Figure 5:
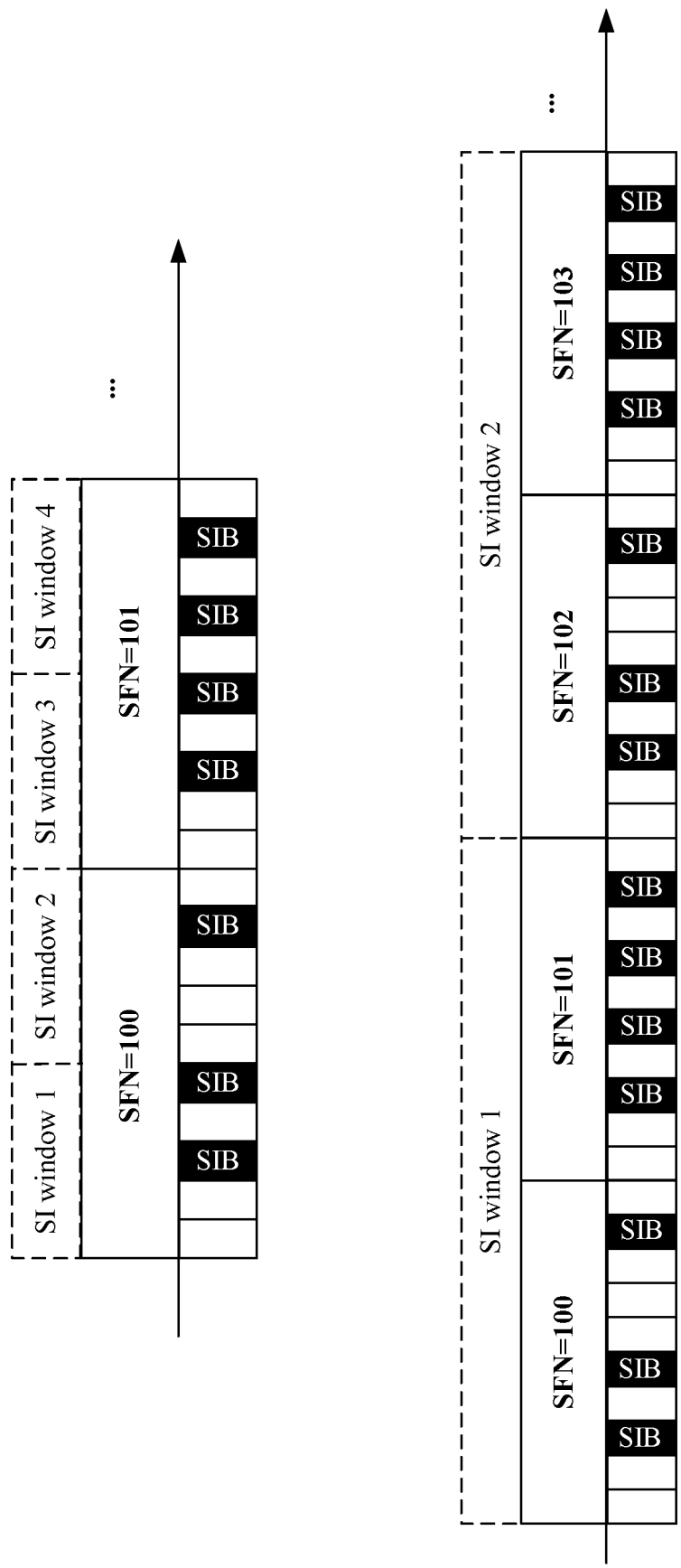
FIG. 5 is a schematic diagram of an application scenario of a time synchronization method according to an embodiment of this application.

In an implementation, as shown in (a) in FIG. 5, for example, a frame length of the SFN is 10 ms. If the SIB includes only the time information, and the end boundary of the SI window is not aligned with a frame trailer of the SFN, the DU may send the SIB in the SI window 1 of the SFN 100. A time in the SIB indicates a time at a boundary of the SFN (SFN 100) immediately after the end boundary of the SI window 1. That is, 11 o'clock, 10 minutes, 5 seconds, 10 milliseconds, 20 microseconds, and 15 nanoseconds on the eleventh day indicates the moment corresponding to the boundary of the SFN 100. It may be understood that, in this implementation, the reference SFN is the SFN 100, and the time information in the SIB indicates the moment corresponding to the boundary of the SFN 100.

In another implementation, as shown in (b) in FIG. 5, if the SIB includes only the time information, and the end boundary of the SI window is aligned with a frame trailer of the SFN, the DU may send the SIB in the SI window 1 of the SFN 101, and a time (11 o'clock, 10 minutes, 5 seconds, 20 milliseconds, 20 microseconds, and 15 nanoseconds on the eleventh day) in the SIB indicates the time at the boundary of the SFN 101 at which the end boundary of the SI window 1 is located. It may be understood that, in this implementation, the reference SFN is the SFN 101, and the time information in the SIB indicates the moment corresponding to the boundary of the SFN 101.

In still another implementation, if the SIB includes the time information and the reference SFN, the DU may send the SIB in the SI window of the SFN 100. A time (11 o'clock, 10 minutes, 5 seconds, 10 milliseconds, 20 microseconds, and 15 nanoseconds on the eleventh day) in the SIB indicates the moment corresponding to the boundary of the SFN 100.

It should be noted that, if the SIB includes the time information and the reference SFN (for example, the SFN 100), the DU may also send the SIB in any SFN after the reference SFN. For example, the DU may send the SIB in an SI window of the SFN 101. An SFN in which the DU sends the SIB is not limited in this embodiment of this application, and descriptions herein are merely examples.

It should be noted that the SFN corresponding to the time information may be any SFN in an SFN 0 to an SFN 1023. During actual application, a frame number of a reference SFN corresponding to specific time information may be determined based on the time information.

S404: The UE receives the SIB sent by the DU.

For example, an RRC layer of the UE receives the SIB sent by the DU.

It should be noted that, because the time information included in the SIB received by the UE indicates the moment corresponding to the boundary of the reference SFN, after receiving the SIB, the UE may determine, based on the time information included in the SIB, the moment corresponding to the boundary of the reference SFN.

In an implementation, if the SIB includes the time information but does not include the reference SFN, and the end boundary of the SI window is not aligned with the frame trailer of the SFN, the reference SFN is an SFN immediately after an end boundary of an SI window for sending the SIB. For example, as shown in (a) in FIG. 5, if the UE receives the SIB in the SI window 1 of the SFN 100, the reference SFN is an SFN immediately after the end boundary of the SI window 1 in which the SIB is sent. That is, the reference SFN is the SFN 100. Therefore, the time information in the SIB indicates the moment corresponding to the boundary of the SFN 100.

In another implementation, if the SIB includes the time information but does not include the reference SFN, and the end boundary of the SI window is aligned with the frame trailer of the SFN, the reference SFN is an SFN at which an end boundary of an SI window for sending the SIB is located. For example, as shown in (b) in FIG. 5, if the UE receives the SIB in the SI window 1, the reference SFN is an SFN at which the end boundary of the SI window 1 for sending the SIB is located. That is, the reference SFN is the SFN 101. Therefore, the time information in the SIB indicates the moment corresponding to the boundary of the SFN 101.

In still another implementation, if the SIB includes the time information and the reference SFN, the time information in the SIB indicates the moment corresponding to the boundary of the reference SFN. For example, when receiving the SIB in the SFN 100, the UE may determine, based on the time information and the SFN 100 that are in the SIB, that the time information indicates a time at the boundary of the SFN 100.

In still another implementation, if the UE receives the SIB in the SFN 101, where the SIB includes the time information and the reference SFN, and the reference SFN is the SFN 100, the UE may determine, based on the time information and the SFN 100 that are in the SIB, that the SFN 100 in the SIB is a system frame that is immediately after the SFN 101 in which the UE performs receiving and whose frame number is equal to the frame number of the reference SFN (SFN 100). That is, the time information in the SIB is corresponding to the time at the boundary of the SFN 100 immediately after the SFN 101 in which the UE performs receiving.

It may be understood that step S404 may be that a plurality of UEs in a same cell receive the SIB broadcast by the DU.

S405: The UE processes the time information to obtain a time reference.

For example, that the UE processes the time information to obtain a time reference may include: determining the time reference based on the UTC time, GPS time, or local time information, and the time type information (timeInfoType) in the time information. The time in the time information is a relative time, and the time reference is an absolute time. Step S405 may be understood as that the relative time is added to a time of the start time point to obtain the absolute time. It may be understood that, in a first case, the terminal receives GPS time information, and determines the time reference based on the received time information and a start time point (00:00:00 on Gregorian calendar date Jan. 6, 1980). In a second case, the terminal receives a local time, and determines the time reference based on the received time information and a start time specified by the upper layer. In a third case, the terminal receives UTC time information, and calculates GPS time information based on the received time, a start time point (00:00:00 on Gregorian calendar date Jan. 1, 1900), and leap second information. For example, the UE may process the time information at the RRC layer to obtain the time reference.

For example, if the time information does not include the time type information, the start point of the time in the time information is 00:00:00 on Gregorian calendar date Jan. 6, 1980 (starting from the GPS time), and the time should be added to the time in the time information when the time reference is determined. If the time type information in the time information is set to a local clock, explanations of the start time point are not specified, and are made by the upper layer. That is, the upper layer (for example, an application layer) may specify the start time point.

It should be noted that, if the time information includes uncertainty, step S405 further includes: calculating uncertainty of the time reference based on the uncertainty and other uncertainty that is related to implementation.

Optionally, the SIB received by the UE may include a plurality of times, and each time may include identifier information of one clock domain.

Optionally, the SIB received by the UE may include a plurality of times, and each time may be an offset relative to a reference time. For example, the time may be an offset relative to the GPS time, the UTC time, or a local time. It may be understood that the DU sends information about a GPS time, UTC time, or local time to the terminal, and time information of another local time is a difference relative to the GPS time, the UTC time, or the local time. The terminal may calculate a time reference of the clock domain based on the difference and the reference time.

It should be noted that, a clock domain based on which the UE determines the time reference may be specified in a protocol, or may be configured by a network. However, a plurality of terminals that are in a cell and that need to achieve high-precision time synchronization should use a time of a same clock domain.

S406: The UE notifies the upper layer of the time reference.

For example, that the UE notifies the upper layer of the time reference may include: The UE notifies the upper layer of the time reference at the moment at the boundary of the reference SFN. It may be understood that the time in the time reference should be corresponding to the moment at the boundary of the reference SFN.

For example, that the UE notifies the upper layer of the time reference may be that the UE notifies the time reference to a layer above the RRC, and the layer above the RRC may include a non-access stratum (NAS) layer, an application layer, or the like.

For example, as shown in (a) in FIG. 5, if the UE receives the SIB in the SI window 1 of the SFN 100, the reference SFN is an SFN immediately after the end boundary of the SI window 1 in which the SIB is sent. That is, the reference SFN is the SFN 100. It may be understood that, in this case, the UE may notify the time reference to the upper layer at the moment at the boundary of the SFN 100.

For example, as shown in (b) in FIG. 5, if the UE receives the SIB in the SI window 1, the reference SFN is an SFN at which the end boundary of the SI window 1 for sending the SIB is located. That is, the reference SFN is the SFN 101. It may be understood that, in this case, the UE may notify the time reference to the upper layer at the moment at the boundary of the SFN 101.

It should be noted that the UE may alternatively notify the upper layer of a first time reference at a first moment (an SFN other than the reference SFN) of a first SFN. However, a time in the first time reference indicates the first moment of the first SFN. For example, if the time reference is 11 o'clock, 10 minutes, 5 seconds, 10 milliseconds, 20 microseconds, and 15 nanoseconds on Jan. 6, 1980, and the reference SFN is the SFN 100, the time reference indicates the moment corresponding to the boundary of the SFN 100. The UE may notify, at the boundary of the SFN 100, the upper layer of 11 o'clock, 10 minutes, 5 seconds, 10 milliseconds, 20 microseconds, and 15 nanoseconds on Jan. 6, 1980; notify, at the boundary of the SFN 101, the upper layer of 11 o'clock, 10 minutes, 5 seconds, 20 milliseconds, 20 microseconds, and 15 nanoseconds on Jan. 6, 1980; or notify, at an intermediate moment of the SFN 101, the upper layer of 11 o'clock, 10 minutes, 5 seconds, 15 milliseconds, 20 microseconds, and 15 nanoseconds on Jan. 6, 1980. A specific moment at which the UE notifies the upper layer of the time reference is not limited in this embodiment of this application. However, the moment at which the UE notifies the upper layer of the time reference should be corresponding to the time in the time reference.

Further, after receiving the time reference, the application layer of the UE may implement time synchronization between the UE and a network side based on the time reference, thereby indirectly achieving time synchronization between UEs. It may be understood that the UE may send the determined time reference to another device by using time synchronization signaling.

This embodiment of this application provides the time synchronization method. The DU obtains the time information. The DU generates the system information block SIB. The DU sends the SIB to the terminal UE. The UE receives the SIB sent by the DU. The UE processes the time information to obtain the time reference. The UE notifies the upper layer of the time reference. In this embodiment, the DU generates the SIB including the time information, and sends the SIB to all the UEs in the cell, so that the UEs can determine, based on the time information in the SIB, the moment at the boundary of the reference SFN corresponding to the time information. Therefore, in a CU-DU split architecture, time synchronization between the terminals in the cell is implemented.

Figure 6:
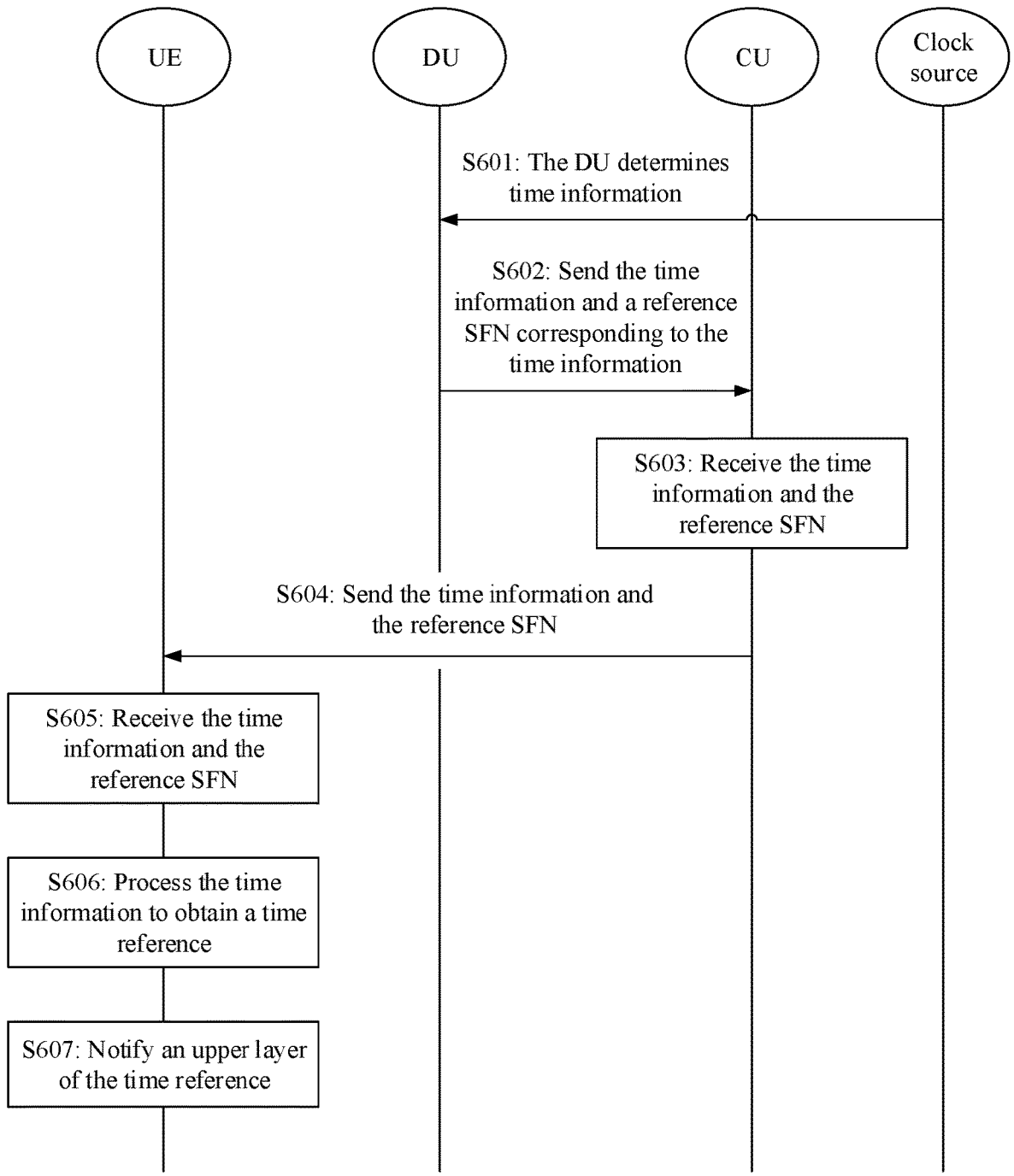
FIG. 6 is a flowchart of another time synchronization method according to an embodiment of this application.

An embodiment of this application further provides a time synchronization method. As shown in FIG. 6, the method includes steps S601 to S605.

S601: A DU determines time information.

It should be noted that an implementation of obtaining the time information by the DU in step S601 is the same as the implementation in step S401. For details, refer to descriptions in step S401. Details are not described herein again.

S602: The DU sends the time information and a reference SFN corresponding to the time information to a CU.

For example, the time information indicates a moment corresponding to a boundary of the reference SFN.

In an implementation, that the DU sends the time information and the reference SFN to the CU may include: The DU generates a system information block SIB, where the SIB includes the time information and the reference SFN. The DU sends the SIB to the CU. For example, the DU may add the time information and the reference SFN corresponding to the time information to the SIB, and then send the SIB to the CU.

In another implementation, that the DU sends the time information and the reference SFN to the CU may include: The DU adds only the time information to the SIB, and sends the time information in the SIB and the reference SFN to the CU. In an example of this implementation, the time information and the reference SFN may be placed in one information element and sent to the CU as a character string, or the time information and the reference SFN may be separately placed in two information elements and sent to the CU. In another example, the time information and the reference SFN may alternatively be sent in one message, or may be separately sent in two messages. It should be noted that a specific manner of sending the time information and the reference SFN is not limited in this embodiment of this application, and descriptions herein are merely examples.

For example, the SIB may be a SIB9, a SIB16, or another newly added SIB. The newly added SIB has been described in the foregoing embodiment, and details are not described herein again.

It may be understood that, before step S602, the method may further include: The CU sends a request message to the DU, where the request message is used to request the time information and the reference SFN corresponding to the time information. After receiving the request message from the CU, the DU sends the time information and the reference SFN to the CU.

Optionally, the CU may configure the DU to report time information corresponding to a frame header boundary or frame trailer boundary of the SFN. For example, the CU includes an SFN number in the request message. After receiving the request message, the DU sends time information corresponding to a boundary of the SFN number to the CU.

Optionally, the CU may configure clock domains, where time information of the clock domains is reported by the DU. For example, the CU includes identifier information of a clock domain in the request message. After receiving the request message, the DU sends time information corresponding to an identifier of the clock domain to the CU.

When the DU has time information of a plurality of clock domains, and a quantity of clock domains required by a terminal is less than or equal to a quantity of clock domains maintained on the DU, the DU may notify the CU of time information of a clock domain required by the terminal.

Optionally, the CU may alternatively configure or request the DU to report time information required by a terminal.

Certainly, the CU may configure the DU to report the time information of the clock domain required by the terminal. That is, the foregoing methods may be used in combination.

For example, in step S602, the DU may further periodically report the time information and the SFN corresponding to the time information to the CU. The reporting periodicity may be indicated by the CU, or may be locally configured. This is not limited in this embodiment of this application.

For example, the DU may send the time information and the SFN corresponding to the time information to the CU through an F1 interface between the DU and the CU.

S603: The CU receives the time information and the reference SFN.

It may be understood that the CU may determine the moment corresponding to the boundary of the reference SFN by receiving the time information and the reference SFN that are sent by the DU. Therefore, in this embodiment, the CU does not need to maintain the SFN number like the DU.

S604: The CU sends the time information and the reference SFN to UE.

For example, that the CU sends the time information and the SFN corresponding to the time information to the UE includes: The CU sends the time information and the SFN corresponding to the time information to the UE by using dedicated signaling. For example, the CU may encapsulate the time information and the reference SFN corresponding to the time information that are sent by the DU, and send the time information and the reference SFN to the UE by using RRC signaling.

Optionally, the dedicated signaling may indicate the identifier information of the clock domain corresponding to the time information.

It may be understood that, when sending the time information and the reference SFN to the UE, the CU may send dedicated signaling that includes the time information and the reference SFN to the DU, and then the DU forwards the dedicated signaling to the UE.

It should be noted that, when the CU sends the RRC signaling to the UE in a unicast manner in step S604, the UE is UE in a cell.

S605: The UE receives the time information and the reference SFN.

For example, the UE receives the time information and the reference SFN corresponding to the time information, and may determine, based on the time information, the moment corresponding to the boundary of the SFN. For example, the time information received by the UE is 11 o'clock, 10 minutes, 5 seconds, 10 milliseconds, 20 microseconds, and 15 nanoseconds, the reference SFN is an SFN 100, and the time information indicates the moment corresponding to the boundary of the SFN 100.

It should be noted that, if the UE receives, in a frame (for example, an SFN 101) other than the reference SFN, the time information and the reference SFN (the SFN 100) that are sent by the CU, the UE may determine, based on the time information and the SFN 100, that the SFN 100 is a system frame that is immediately after the SFN 101 in which the UE performs receiving and whose frame number is equal to a frame number (SFN 100) of the reference SFN. That is, the time information is corresponding to the time at the boundary of the SFN 100 immediately after the SFN 101 in which the UE performs receiving.

S606: The UE processes the time information to obtain a time reference.

S607: The UE notifies an upper layer of the time reference.

It should be noted that specific implementations of steps S606 and S607 are the same as those of steps S405 and S406. For details, refer to descriptions of steps S405 and S406. Details are not described herein again.

It may be understood that, because an SFN frame of the UE is aligned with an SFN frame of a network side, the UE may determine, based on the time information, the moment corresponding to the boundary of the reference SFN, convert the time information into an absolute time, and notify the upper layer of the time reference, to implement time synchronization between the terminal and a network device. In this way, time synchronization between UEs is indirectly achieved.

This embodiment of this application provides the time synchronization method. The DU obtains the time information. The DU sends the time information and the reference SFN corresponding to the time information to the CU. The CU receives the time information and the reference SFN. The CU sends the time information and reference SFN to the UE. The UE receives the time information and the reference SFN. The UE processes the time information to obtain the time reference. The UE notifies the upper layer of the time reference. In this embodiment, the DU sends the time information and the reference SFN corresponding to the time information to the CU. After receiving the correspondence, the CU may send the correspondence between the time information and the SFN to the UE by using the dedicated signaling, so that time synchronization between terminals in a cell is implemented in a CU-DU split architecture.

Figure 7:
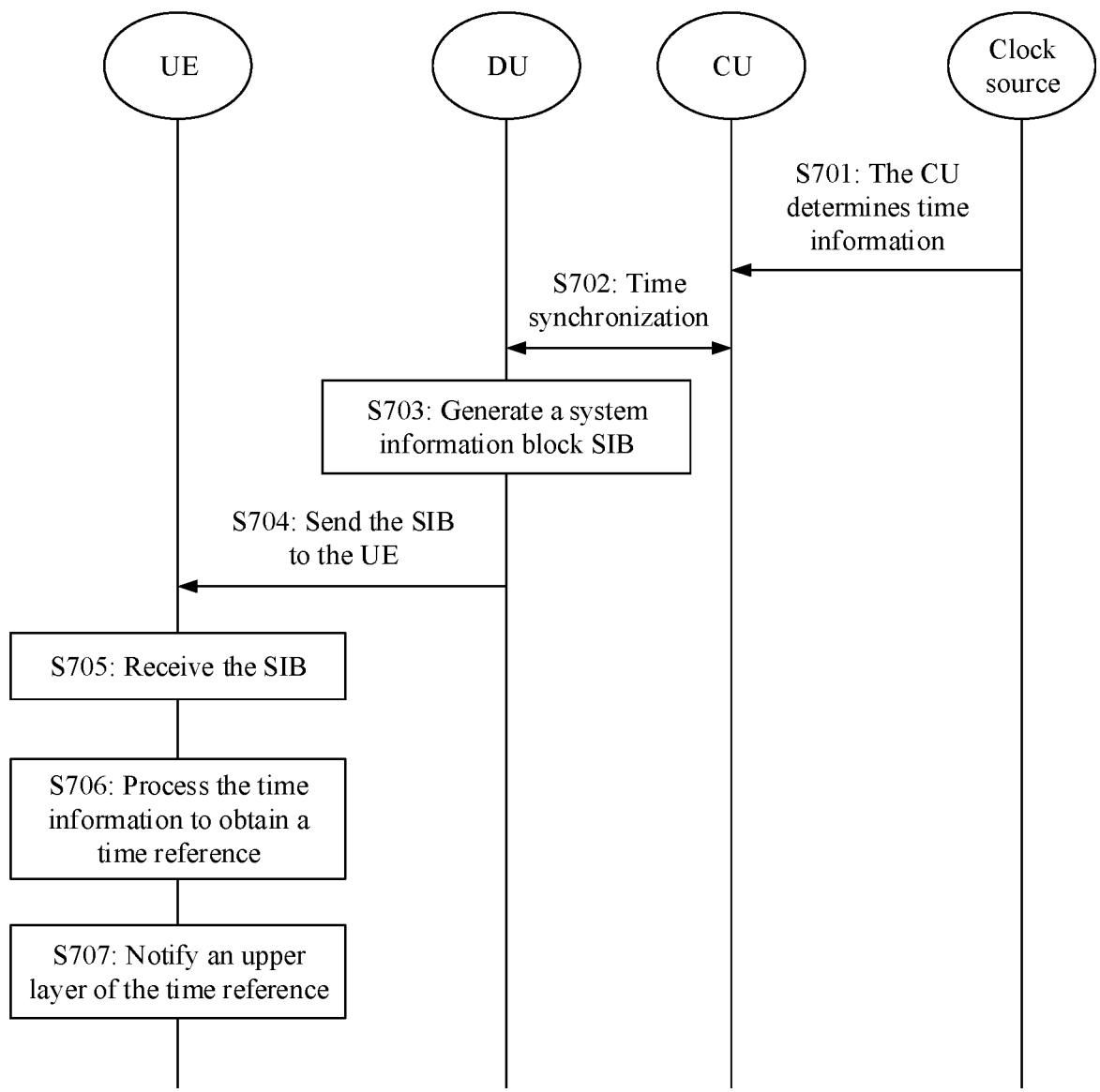
FIG. 7 is a flowchart of another time synchronization method according to an embodiment of this application.

An embodiment of this application provides still another time synchronization method. As shown in FIG. 7, the method includes steps S701 to S707.

S701: A CU determines time information.

It should be noted that an implementation of obtaining the time information by the CU in step S701 is the same as the implementation of obtaining the time information by the DU in step S401. For details, refer to descriptions in step S401. Details are not described herein again.

This step is optional.

S702: The CU performs time synchronization with a DU based on the time information.

For example, the CU may perform time synchronization with the DU based on the time information obtained from a clock source, to implement time synchronization between the CU and the DU. A specific method for performing time synchronization between the CU and the DU is not limited in this embodiment of this application, and time synchronization between the CU and the DU may be implemented according to a method for synchronizing two nodes in TS38.331.

S703: The DU generates a system information block SIB.

S704: The DU sends the SIB to a terminal UE.

S705: The UE receives the SIB sent by the DU.

S706: The UE processes the time information to obtain a time reference.

S707: The UE notifies an upper layer of the time reference.

Specific implementations of steps S703 to S707 are the same as those of steps S402 to S406. For details, refer to descriptions of steps S402 to S406. Details are not described herein again. It should be noted that, different from the foregoing embodiment, in this embodiment of this application, the CU obtains the time information, and performs time synchronization with the DU, so that the SFN maintained by the DU may be corresponding to the time information. Then, the DU sends the time information and the reference SFN corresponding to the time information to the UE, so that the UE determines, based on the time information, the moment corresponding to the boundary of the reference SFN corresponding to the time information, thereby implementing time synchronization.

This embodiment of this application provides the time synchronization method. The CU obtains the time information. The CU performs time synchronization with the DU based on the time information. The DU generates the system information block SIB. The DU sends the SIB to the terminal UE. The UE receives the SIB sent by the DU. The UE processes the time information to obtain the time reference. The UE notifies the upper layer of the time reference. In this embodiment, the DU obtains the time information, and performs time synchronization with the DU, so that the SFN maintained by the DU is synchronized with the time information. Then, the DU generates the SIB including the time information, and sends the SIB to all UEs in a cell, so that the UEs can determine, based on the time information in the SIB, the moment at the boundary of the reference SFN corresponding to the time information. Therefore, in a CU-DU split architecture, time synchronization between the terminals in the cell is implemented.

Figure 8:
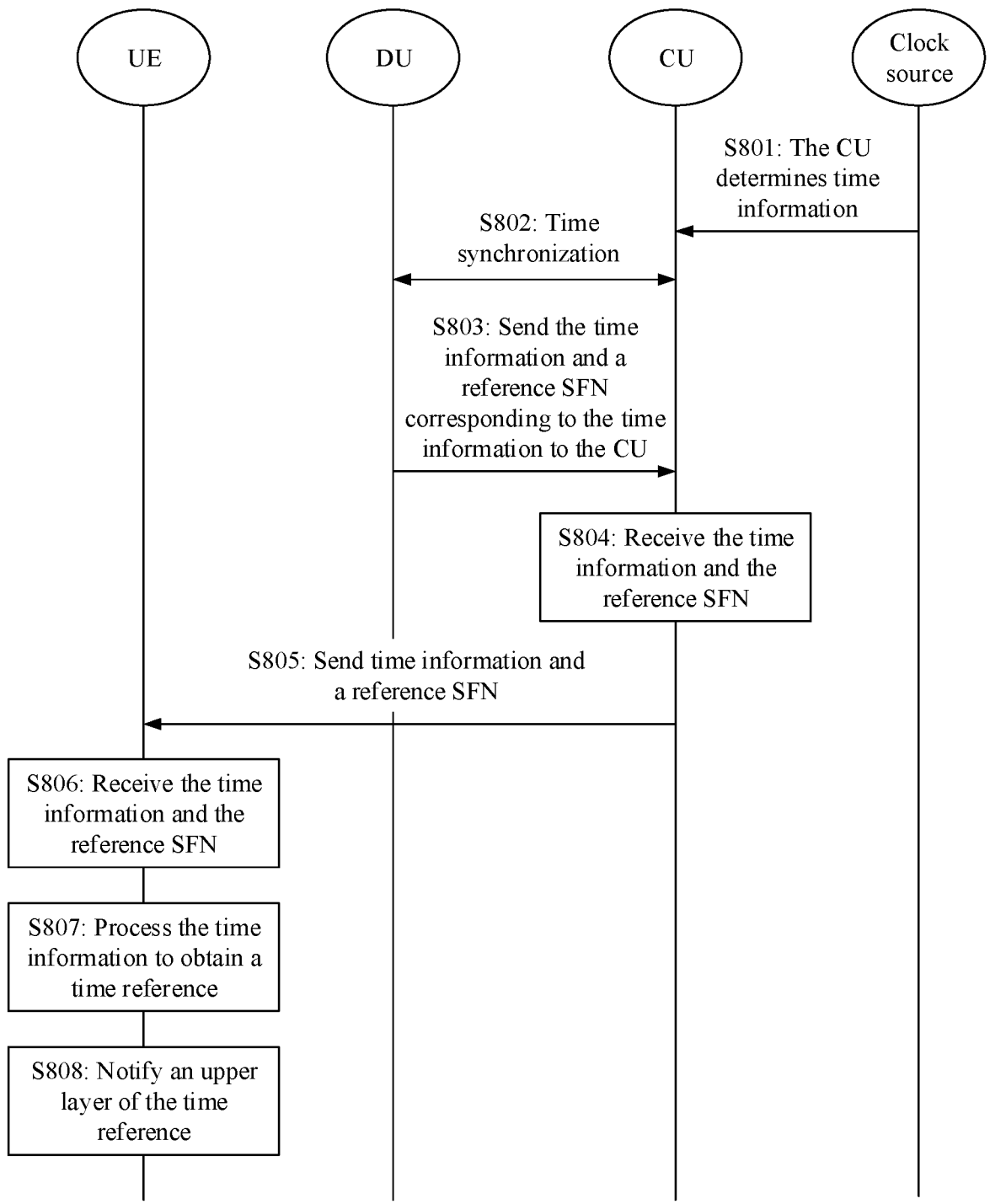
FIG. 8 is a flowchart of another time synchronization method according to an embodiment of this application.

An embodiment of this application provides still another time synchronization method. As shown in FIG. 8, the method includes steps S801 to S808.

S801: A CU determines time information.

It should be noted that an implementation of obtaining the time information by the CU in step S801 is the same as the implementation of obtaining the time information by the DU in step S401. For details, refer to descriptions in step S401. Details are not described herein again.

S802: The CU performs time synchronization with a DU based on the time information.

It should be noted that an implementation of performing time synchronization with the DU by the CU based on the time information in step S802 is the same as the implementation of step S702. For details, refer to descriptions in step S702. Details are not described herein again.

S803. The DU sends the time information and a reference SFN corresponding to the time information to a CU.

Optionally, the DU may perform step S803 after receiving a request from the CU or reporting a configuration.

S804: The CU receives the time information and the reference SFN.

A relationship between the time information and the reference SFN is the same as that in the foregoing embodiment, and details are not described herein again.

S805: The CU sends time information and a reference SFN to UE.

It may be understood that in steps S801 to S804, the CU performs time synchronization with the DU, and receives the time information and the reference SFN that are sent by the DU, so that the CU and the DU can maintain SFNs synchronously. Therefore, the time information and the reference SFN that are sent by the CU to the UE in step S805 may be different from the time information and the reference SFN in steps S801 to S804. That is, the time information and the reference SFN that are sent to the UE in step S805 may be: After obtaining new time information from a clock source, the CU sends a new reference SFN corresponding to the new time information to the UE based on the SFN number autonomously maintained by the CU.

S806: The UE receives the time information and the SFN corresponding to the time information.

S807: The UE processes the time information to obtain a time reference.

S808: The UE notifies an upper layer of the time reference.

Specific implementations of steps S803 to S808 are the same as those of steps S602 to S607. For details, refer to descriptions of steps S602 to S607. Details are not described herein again. It should be noted that, different from the second embodiment, in this embodiment of this application, the CU obtains the time information. Because the CU does not maintain an SFN, the CU may maintain the SFN numbers synchronously with the DU based on the time information and the reference SFN that are sent by the DU, and autonomously sends dedicated signaling to the UE, to notify the UE of a moment corresponding to a boundary of the reference SFN. That is, in this embodiment, after time synchronization is performed between the DU and the CU, the DU sends the time information and the reference SFN to the CU, so that the CU and the DU maintain the SFN synchronously.

This embodiment of this application provides the time synchronization method. The CU obtains the time information. The CU performs time synchronization with the DU based on the time information. The DU sends the time information and the reference SFN corresponding to the time information to the CU. The CU receives the time information and the reference SFN. The CU sends the time information and reference SFN to the UE. The UE receives the time information and the reference SFN. The UE processes the time information to obtain the time reference. The UE notifies the upper layer of the time reference. In this embodiment, time synchronization is performed between the CU and the DU, and the CU receives the time information and the reference SFN that are sent by the DU, so that the CU and the DU can maintain SFNs synchronously, and send the time information and the reference SFN to the UE by using dedicated signaling based on the autonomously maintained SFN. In this way, in a CU-DU split architecture, the CU and the DU can maintain the SFN synchronously, to implement time synchronization between terminals in a cell.

Figure 9:
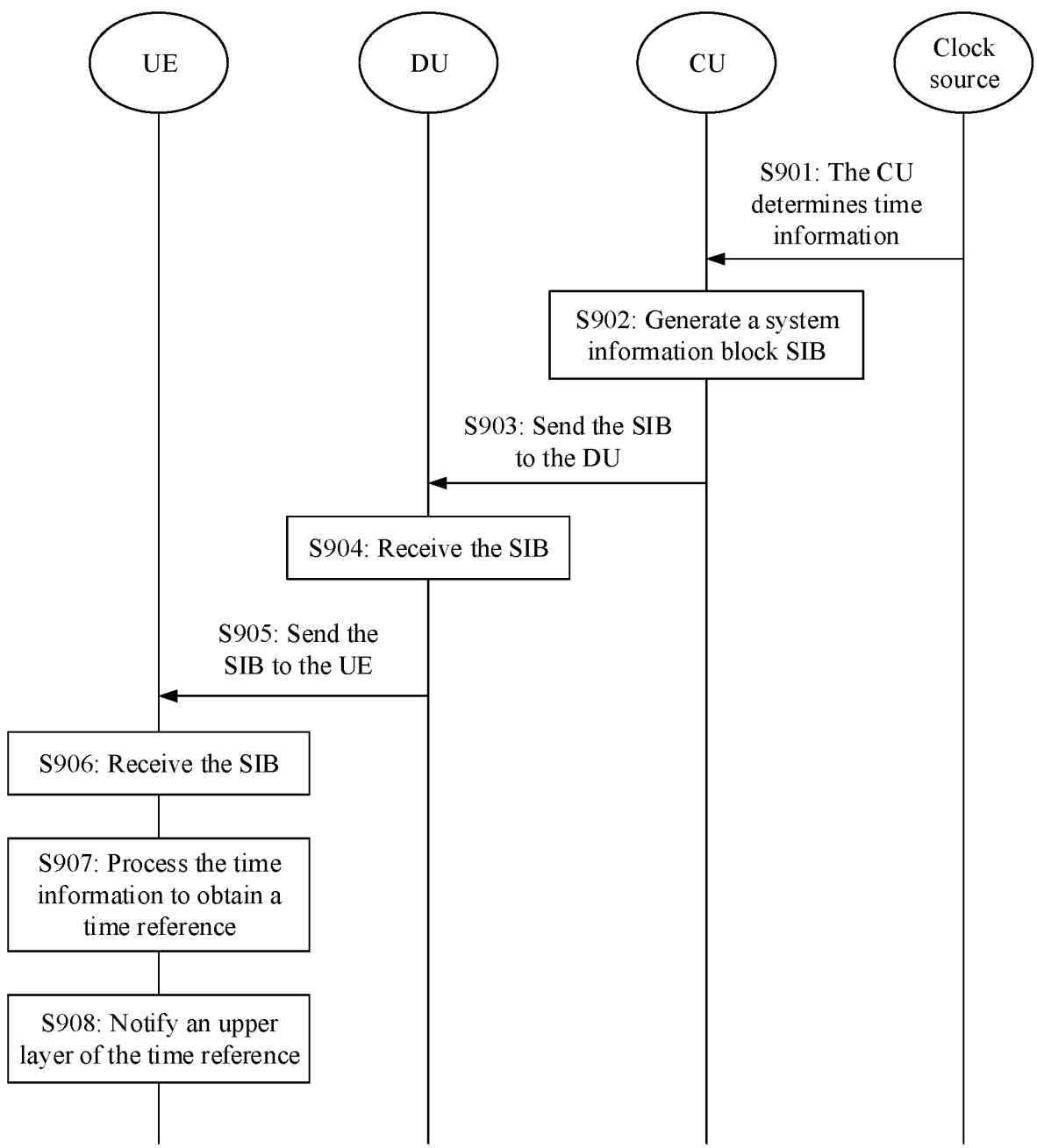
FIG. 9 is a flowchart of another time synchronization method according to an embodiment of this application.

An embodiment of this application provides yet another time synchronization method. As shown in FIG. 9, the method is performed when a time of a CU is synchronized with a time of a DU and an SFN maintained by the CU is synchronized with an SFN maintained by the DU. The method includes steps S901 to S908.

S901: A CU determines time information.

It should be noted that an implementation of obtaining the time information by the CU in step S901 is the same as the implementation of obtaining the time information by the DU in step S401. For details, refer to descriptions in step S401. Details are not described herein again.

S902: The CU generates a SIB.

The SIB includes time information and a reference SFN corresponding to the time information, where the time information is a moment corresponding to a boundary of the reference SFN.

For example, a type of the SIB may be a SIB16, a SIB9, or a SIBX. The SIBX is a newly added SIB. The newly added SIB has been described in the foregoing embodiment, and details are not described herein again. In this embodiment of this application, a specific SIB generated by the CU is not limited, and descriptions herein are merely examples. It may be understood that, compared with an existing SIB, in the SIB, the time information and the reference SFN are added to the existing SIB.

S903: The CU sends the SIB to a DU.

For example, the CU may send the generated SIB to the DU through an F1 interface between the CU and the DU.

It should be noted that, in this embodiment, the CU autonomously maintains an SFN, and sends the time information and the reference SFN to the DU, to assist the DU in obtaining a correspondence between the time information and the reference SFN.

Optionally, the CU may perform step S903 after receiving a request from the DU or reporting a configuration.

S904: The DU receives the SIB.

S905: The DU sends the SIB to UE.

S906: The UE receives the SIB sent by the DU.

S907: The UE processes the time information to obtain a time reference.

S908: The UE notifies an upper layer of the time reference.

Specific implementations of steps S905 to S907 are the same as those of steps S403 to S406. For details, refer to descriptions of steps S403 to S406. Details are not described herein again.

It may be understood that, in this embodiment, when the time of the CU is synchronized with the time of the DU, and the SFN of the CU is synchronized with the SFN of the DU, the CU autonomously maintains the SFN, and assists the DU in obtaining the time information and the reference SFN. It may be understood that time and SFN synchronization between the CU and the DU may be implemented by performing steps S801 to S804.

This embodiment of this application provides the time synchronization method. The CU obtains the time information. The CU generates the SIB. The CU sends the SIB to the DU. The DU receives the SIB. The DU sends the SIB to the UE. The UE receives the SIB sent by the DU. The UE processes the time information to obtain the time reference. The UE notifies the upper layer of the time reference. In this embodiment, the CU autonomously maintains the SFN, and assists the DU in obtaining the correspondence between the time information and the reference SFN. Then, the DU sends the correspondence to the UE by using a broadcast message, so that time synchronization between terminals in the cell can be implemented in a CU-DU split architecture.

Figure 10:
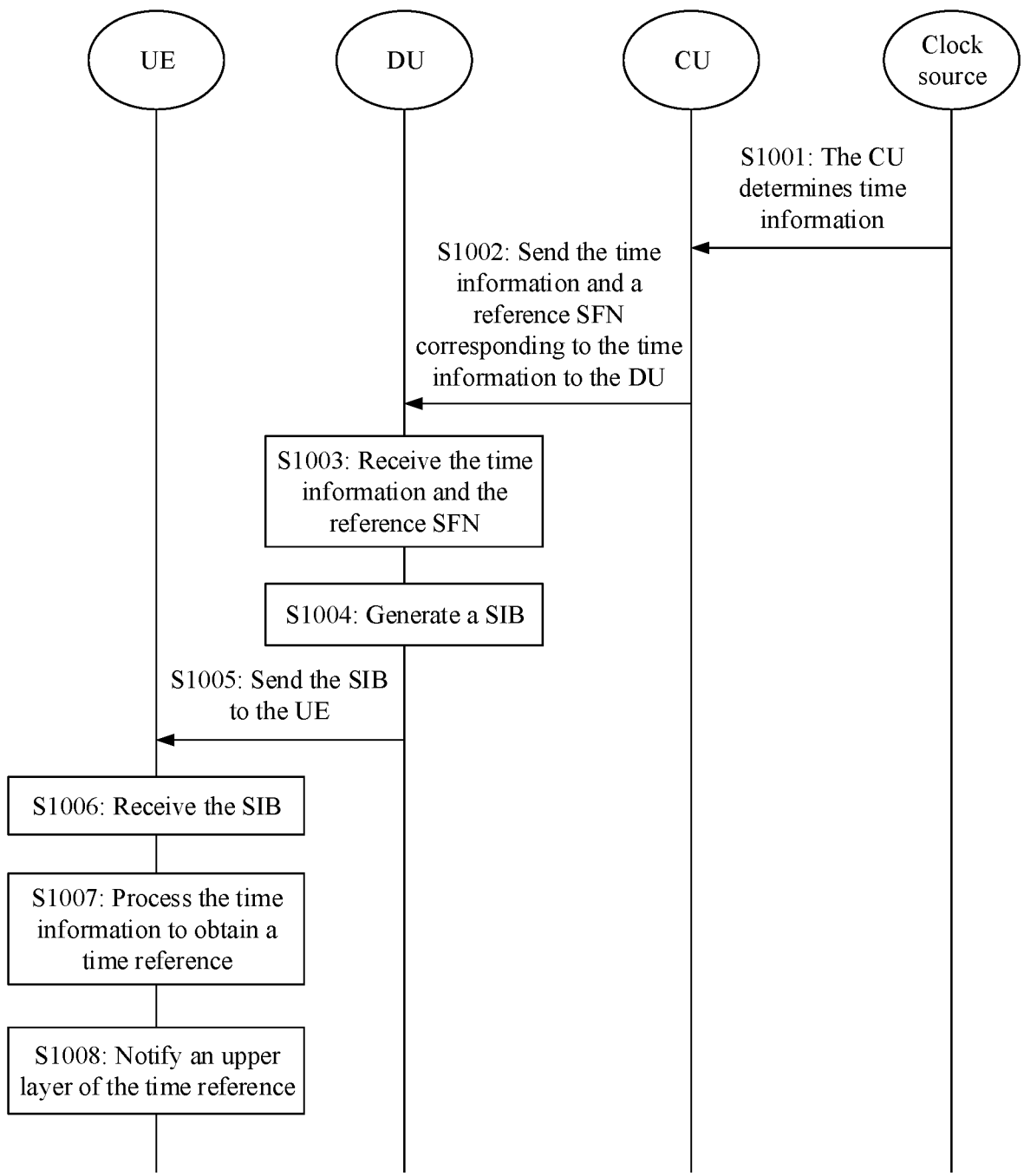
FIG. 10 is a flowchart of another time synchronization method according to an embodiment of this application.

An embodiment of this application provides yet another time synchronization method. As shown in FIG. 10, the method is performed when a time of a CU is synchronized with a time of a DU and an SFN maintained by the CU is synchronized with an SFN maintained by the DU. The method includes steps S1001 to S1008.

S1001: ACU determines time information.

It should be noted that an implementation of obtaining the time information by the CU in step S1001 is the same as the implementation of obtaining the time information by the DU in step S401. For details, refer to descriptions in step S401. Details are not described herein again.

S1002: The CU sends the time information and a reference SFN corresponding to the time information to a DU.

It may be understood that, in this embodiment, when the time of the CU is synchronized with the time of the DU, and the SFN of the CU is synchronized with the SFN of the DU, the CU autonomously maintains the SFN number. Therefore, the CU sends the time information and the reference SFN to the DU, to assist the DU in obtaining the time reference.

Optionally, the CU may perform step S1002 after receiving a request from the DU or reporting a configuration.

It should be noted that, before step S1001 is performed, in this embodiment, time and SFN synchronization between the CU and the DU may be implemented by performing steps S801 to S804.

For example, the CU may place the time information and the reference SFN in one information element, and send the information element to the CU as a character string. Alternatively, the CU may separately place the time information and the reference SFN in two information elements, and send the information elements to the DU. A specific manner of sending the time information and the reference SFN is not limited in this embodiment of this application, and descriptions herein are merely examples.

S1003: The DU receives the time information and the reference SFN.

S1004: The DU generates a SIB.

S1005: The DU sends the SIB to a terminal UE.

S1006: The UE receives the SIB sent by the DU.

S1007: The UE processes the time information to obtain a time reference.

S1008: The UE notifies an upper layer of the time reference.

Specific implementations of steps S1004 to S1008 are the same as those of steps S402 to S406. For details, refer to descriptions of steps S402 to S406. Details are not described herein again.

This embodiment of this application provides the time synchronization method. The CU obtains the time information. The CU sends the time information and the reference SFN corresponding to the time information to the DU. The DU receives the time information and the reference SFN. The DU sends the time information and reference SFN to the UE by using the SIB. The UE processes the time information to obtain the time reference. The UE notifies the upper layer of the time reference. In this embodiment, when the time and the SFN of the CU are synchronized with the time and the SFN of the DU, the CU sends the time information and the SFN corresponding to the time information to the DU, to assist the DU in obtaining the time information and the reference SFN, thereby implementing time synchronization between terminals.

Figure 11:
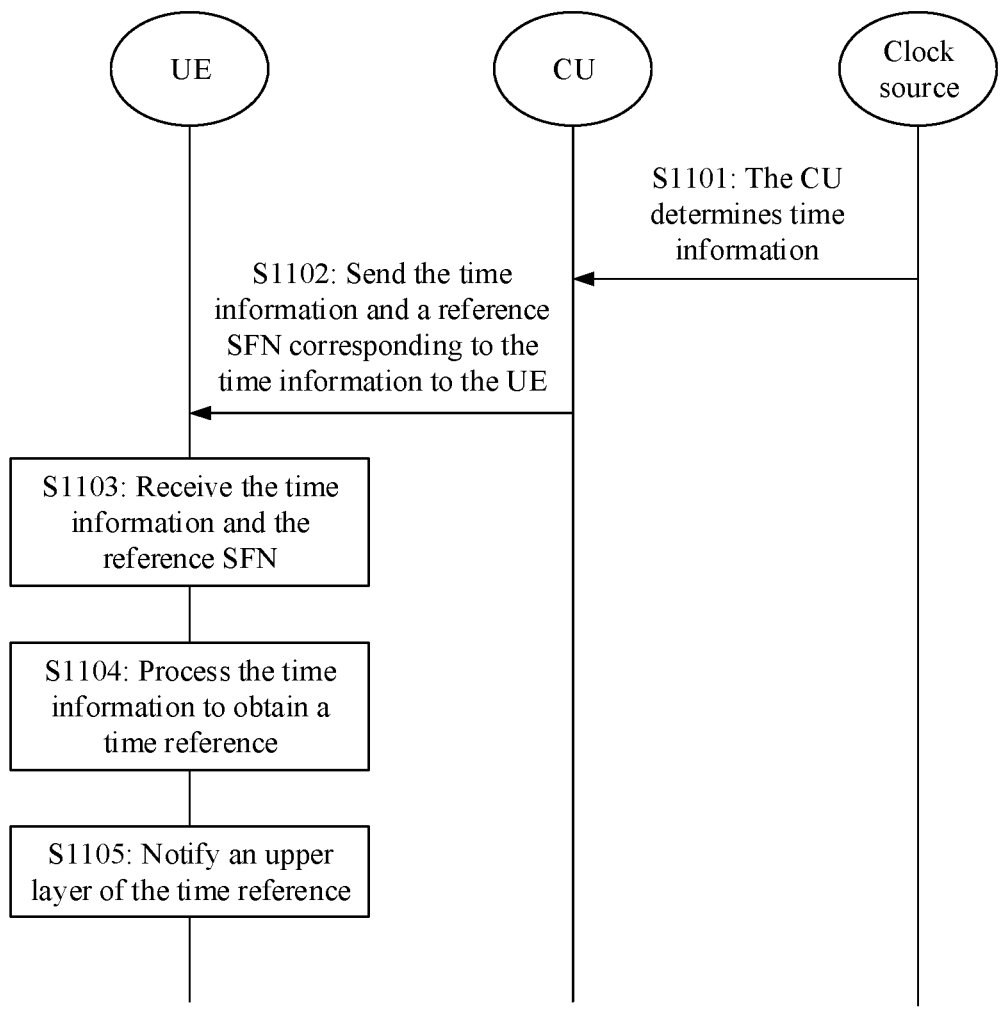
FIG. 11 is a flowchart of another time synchronization method according to an embodiment of this application.

An embodiment of this application provides yet another time synchronization method. As shown in FIG. 11, the method is performed when a time of a CU is synchronized with a time of a DU and an SFN maintained by the CU is synchronized with an SFN maintained by the DU. The method includes steps S1101 to S1105.

S1101: A CU determines time information.

S1102: The CU sends the time information and a reference SFN corresponding to the time information to UE.

It should be noted that, different from the embodiment 2, in this embodiment, the CU autonomously maintains an SFN, and after obtaining the time information from a clock source, the CU sends, based on the autonomously maintained SFN number, the reference SFN corresponding to the time information to the UE.

S1103: The UE receives the time information and the reference SFN.

S1104: The UE processes the time information to obtain a time reference.

S1105: The UE notifies an upper layer of the time reference.

It should be noted that specific implementations of steps S1103 to S1105 are the same as those of steps S605 to S607. For details, refer to descriptions of steps S605 to S607. Details are not described herein again.

This embodiment of this application provides the time synchronization method. The CU obtains the time information. The CU sends the time information and the reference SFN corresponding to the time information to the UE. The UE receives the time information and the reference SFN. The UE processes the time information to obtain the time reference. The UE notifies the upper layer of the time reference. In this embodiment, when the time and the SFN of the CU are synchronized with the time and the SFN of the DU, after obtaining the time information, the CU sends the time information and the reference SFN corresponding to the time information to the UE by using the SFN autonomously maintained by the CU, to implement time synchronization between terminals in a cell in a CU-DU split architecture.

Figure 12:
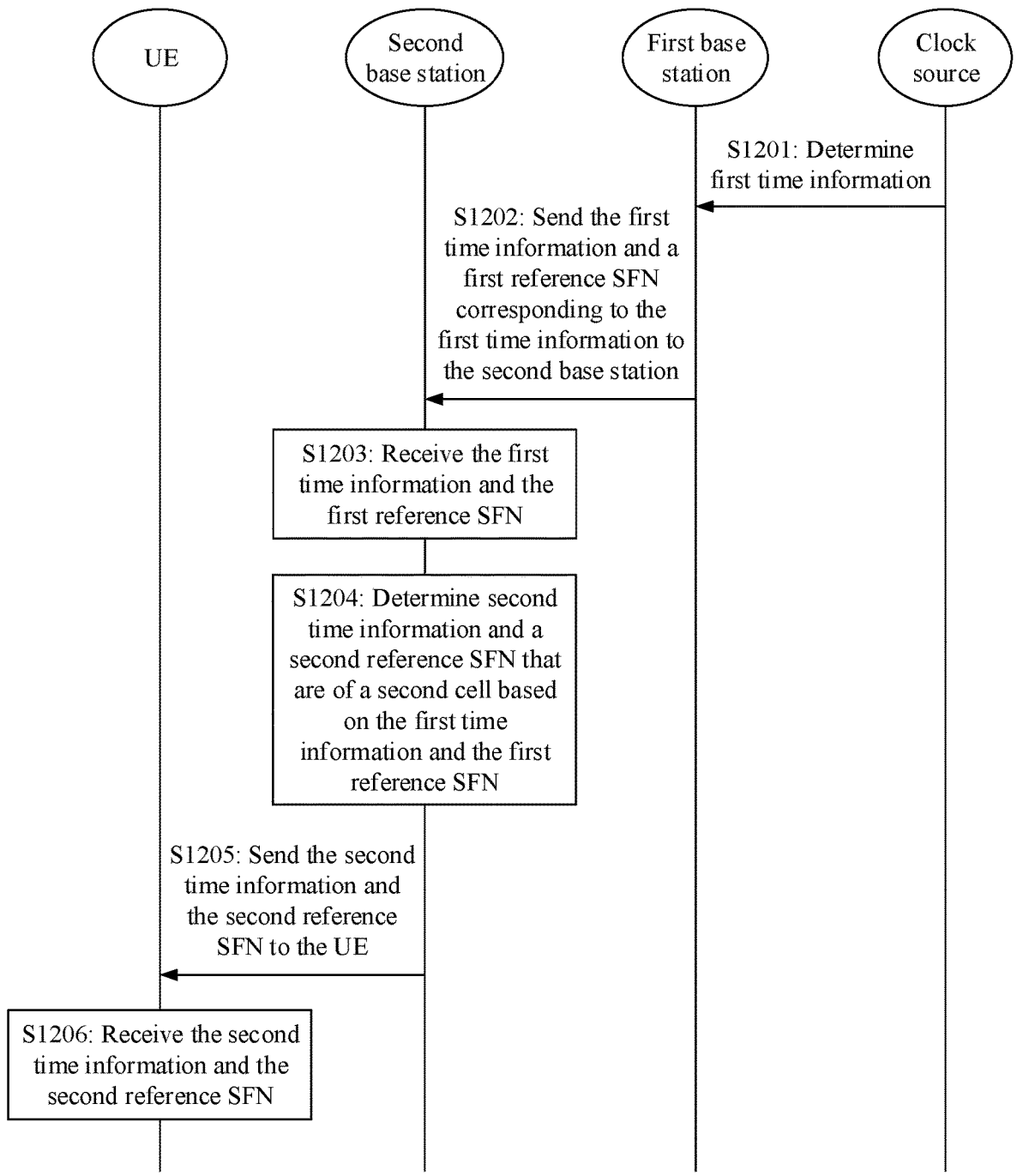
FIG. 12 is a flowchart of another time synchronization method according to an embodiment of this application.

An embodiment of this application further provides yet another time synchronization method. As shown in FIG. 12, the method includes steps S1201 to S1206.

S1201: A first base station determines first time information of a first cell.

The first cell is any cell served by the first base station. A time unit of the first time information may be millisecond, microsecond, femtosecond, nanosecond, or another time unit of a smaller order of magnitude. A specific precision level of the time unit of the time information is not limited in this embodiment of this application, and descriptions herein are merely examples. For the time unit, refer to descriptions in the foregoing embodiments, and details are not described herein again.

It may be understood that, that a first base station determines first time information of a first cell may be: A DU or a CU of the first base station determines the first time information.

S1202: The first base station sends the first time information and a first reference SFN corresponding to the first time information to a second base station.

For example, the first time information is a moment corresponding to a boundary of the first reference SFN, and the first base station sends the first time information of the first cell and the first reference SFN to the second base station.

S1203: The second base station receives the first time information and the first reference SFN.

S1204: The second base station determines second time information and a second reference SFN that are of a second cell based on the first time information and the first reference SFN.

The second time information is a moment corresponding to a boundary of the second reference SFN. The second cell is any cell served by the second base station.

For example, step S1204 may include: The second base station determines an SFN deviation and an intra-frame deviation between the first cell and the second cell. The second base station determines the second time information and second SFN based on the SFN deviation, the intra-frame deviation, the first time information, and the first reference SFN. The SFN deviation and the intra-frame deviation may be reported to the second base station via a terminal. Alternatively, the SFN deviation and the intra-frame deviation may be reported to the first base station via a terminal, and then sent to the second base station by the first base station. Alternatively, the second base station automatically detects downlink information of the first base station, to determine the SFN deviation and the intra-frame deviation. A specific manner of determining the SFN deviation and the intra-frame deviation by the second base station is not limited in this embodiment of this application.

Figure 13:
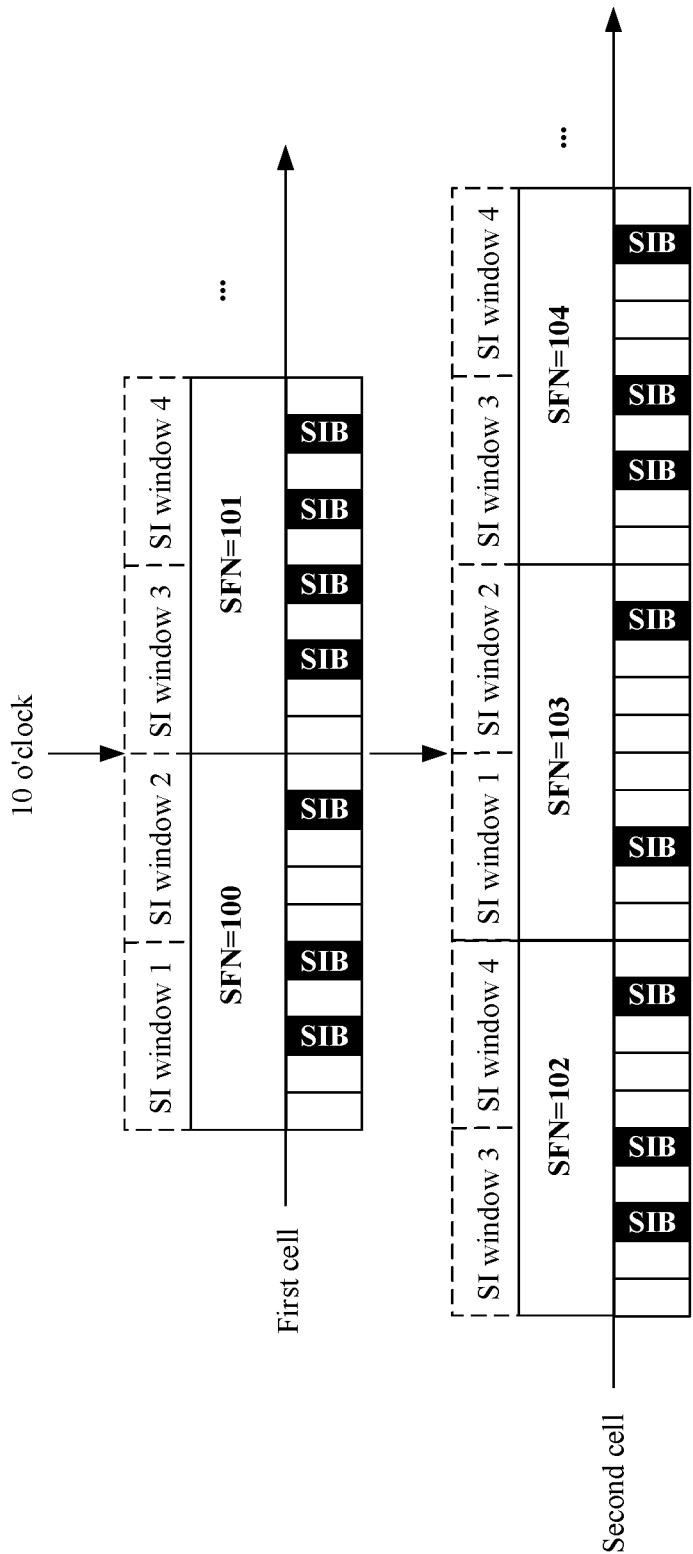
FIG. 13 is a schematic diagram of an application scenario of another time synchronization method according to an embodiment of this application.

For example, as shown in FIG. 13, if time information of the first cell is 10 o'clock, 10 o'clock is a moment corresponding to a frame trailer boundary of an SFN 100, an SFN of the first cell is an SFN 100, an SFN of the second cell is an SFN 103, and the intra-frame deviation of the two cells is 5 milliseconds. In this case, it may be determined that the time information (10 o'clock and 5 milliseconds) of the second cell is a moment corresponding to a frame trailer boundary of the SFN 103. Therefore, the second time information may be 10 o'clock and 5 milliseconds, and the second reference SFN may be the SFN 103. It should be noted that the second time information may alternatively be 10 o'clock and 15 milliseconds. In this case, the second reference SFN is an SFN 104, and 10 o'clock and 15 milliseconds is a moment corresponding to a frame trailer boundary of the SFN 104. Alternatively, the first time information may be 9 o'clock, 59 seconds, and 55 milliseconds. In this case, the second reference SFN is an SFN 102, and 9 o'clock, 59 seconds, and 55 milliseconds is a moment corresponding to a frame trailer boundary of the SFN 102. This is not limited in this embodiment of this application. It should be noted that the second time information should be the moment corresponding to the boundary of the second reference SFN. Herein, only an example in which the boundary of the SFN is a frame trailer boundary of the SFN is used for description.

S1205: The second base station sends the second time information and the second reference SFN to a terminal UE.

For example, when sending the second time information and the second reference SFN to the UE, the second base station may send the second time information and the second reference SFN to the UE in a broadcast or unicast manner. For details, refer to the foregoing embodiments. Details are not described herein again.

S1206: The UE receives the second time information and the second reference SFN.

Further, after receiving the second time information and the second reference SFN, the UE may implement time synchronization between the UE and a network side based on a correspondence between the second time and the second reference SFN, thereby implementing time synchronization between terminals in the second cell.

It may be understood that, because costs of obtaining time information from a clock source by each base station are relatively high, in this embodiment, a correspondence between time information of a cell of a base station and a reference SFN can be determined by using a correspondence between a reference SFN and time information obtained by another base station from the clock source, to implement time synchronization between terminals in the cell of the base station.

This embodiment of this application provides the time synchronization method. The first base station obtains the first time information of the first cell. The second base station receives the first time information and the first reference SFN. The second base station determines the second time information and the second reference SFN that are of the second cell based on the first time information and the first reference SFN. The second base station sends the second time information and the second reference SFN to the terminal UE. The UE receives the second time information and the second reference SFN, thereby implementing time synchronization between UEs. In this embodiment, the another base station assists the base station in determining a correspondence between time information and a reference SFN, so that costs of obtaining the time information from the clock source by the base station can be reduced while time synchronization is implemented.

The foregoing describes, mainly from the perspective of method steps, the solutions provided in the embodiments of this application. It may be understood that, to implement the foregoing functions, a computer includes corresponding hardware structures and/or software modules for performing the functions. A person skilled in the art should be easily aware that, in combination with modules and algorithm steps of the examples described in the embodiments disclosed in this specification, this application may be implemented by a combination of hardware and computer software. A person skilled in the art may use different methods to implement the described functions for each particular application, but it should not be considered that the implementation goes beyond the scope of this application.

In the embodiments of this application, the CU and the DU may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that module division in the embodiments of this application is an example, and is merely a logical function division. During actual implementation, another division manner may be used.

Figure 14:
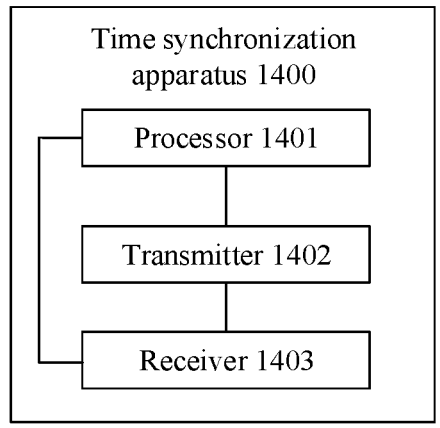
FIG. 14 is a schematic composition diagram of a time synchronization apparatus according to an embodiment of this application.

When each functional module is obtained through division based on each corresponding function, FIG. 14 is a possible schematic structural diagram of a time synchronization apparatus in the foregoing embodiments. The time synchronization apparatus 1400 includes a processor 1401, a transmitter 1402, and a receiver 1403. The processor 1401 may be configured to support the time synchronization apparatus 1400 in performing S401 and S402 in FIG. 4, S601 in FIG. 6, S703 in FIG. 7, or S1004 in FIG. 10. The transmitter 1402 may be configured to support the time synchronization apparatus 1400 in performing S403 in FIG. 4, S602 in FIG. 6, S704 in FIG. 7, S803 in FIG. 8, S905 in FIG. 9, or S1005 in FIG. 10. The receiver 1403 is configured to support the time synchronization apparatus 1400 in performing S904 in FIG. 9 or S1003 in FIG. 10. All related content of the steps in the foregoing method embodiments may be cited in function descriptions of a corresponding functional module, and details are not described herein again. It may be understood that the time synchronization apparatus 1400 may be the DU device in the foregoing embodiments.

Figure 15:
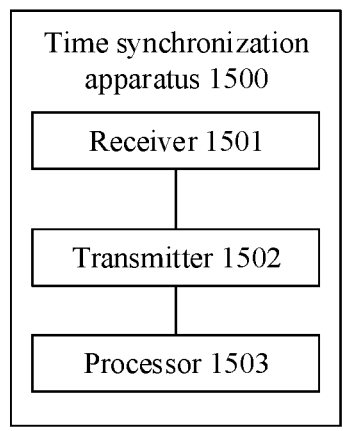
FIG. 15 is a schematic composition diagram of another time synchronization apparatus according to an embodiment of this application.

When each functional module is obtained through division based on each corresponding function, FIG. 15 is a possible schematic structural diagram of a time synchronization apparatus in the foregoing embodiments. The time synchronization apparatus 1500 includes a receiver 1501, a transmitter 1502, and a processor 1503. The receiver 1501 may be configured to support the time synchronization apparatus 1500 in performing S603 in FIG. 6 or S804 in FIG. 8. The transmitter 1502 may be configured to support the time synchronization apparatus 1500 in performing S604 in FIG. 6, S805 in FIG. 8, S903 in FIG. 9, S1102 in FIG. 10, or S1102 in FIG. 11. The processor 1503 may be configured to support the time synchronization apparatus 1500 in performing S701 and S702 in FIGS. 7, S801 and S802 in FIGS. 8, S901 and S902 in FIG. 9, S1001 in FIG. 10, or S1101 in FIG. 11. All related content of the steps in the foregoing method embodiments may be cited in function descriptions of a corresponding functional module, and details are not described herein again. It may be understood that the time synchronization apparatus 1500 may be the CU device in the foregoing embodiments.

Figure 16:
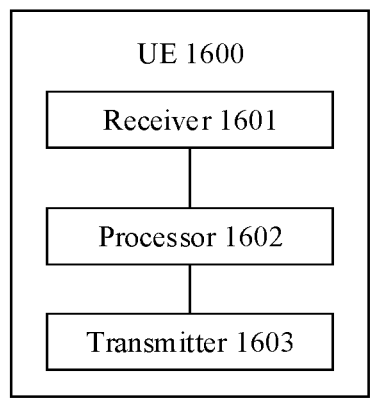
FIG. 16 is a schematic composition diagram of a terminal according to an embodiment of this application.

When each functional module is obtained through division based on each corresponding function, FIG. 16 is a possible schematic structural diagram of a terminal UE in the foregoing embodiments. The UE 1600 includes a receiver 1601, a processor 1602, and a transmitter 1603. The receiver 1601 may be configured to support the UE 1600 in performing S404 in FIG. 4, S605 in FIG. 6, S705 in FIG. 7, S806 in FIG. 8, S906 in FIG. 9, S1006 in FIG. 10, or S1103 in FIG. 11. The processor 1602 may be configured to support the UE 1600 in performing S405 in FIG. 4, S606 in FIG. 6, S706 in FIG. 7, S807 in FIG. 8, S907 in FIG. 9, S1007 in FIG. 10, or S1104 in FIG. 11. The transmitter 1603 may be configured to support the UE 1600 in performing S406 in FIG. 4, S607 in FIG. 6, S707 in FIG. 7, S808 in FIG. 8, S908 in FIG. 9, S1008 in FIG. 10, or S1105 in FIG. 11. All related content of the steps in the foregoing method embodiments may be cited in function descriptions of a corresponding functional module, and details are not described herein again.

Figure 17:
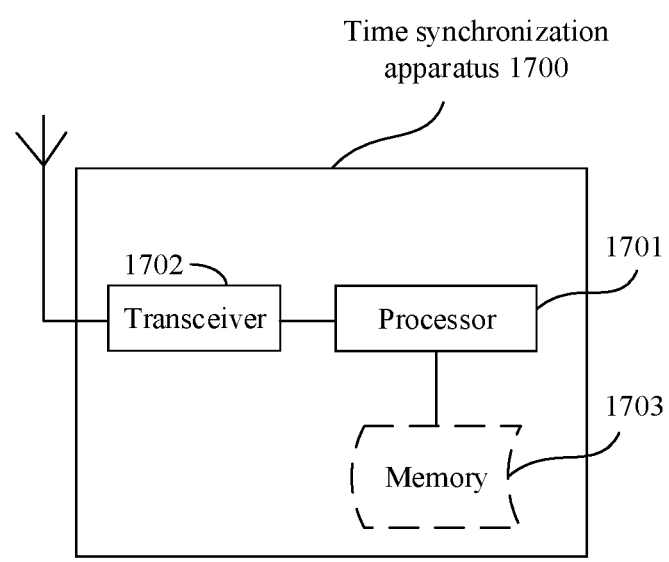
FIG. 17 is a schematic composition diagram of another time synchronization apparatus according to an embodiment of this application.

When an integrated unit is used, FIG. 17 is a schematic diagram of a possible schematic structural diagram of a time synchronization apparatus 1700 in the foregoing embodiments. The time synchronization apparatus 1700 includes a processor 1701 and a transceiver 1702. The processor 1701 is configured to control and manage an action of the time synchronization apparatus 1700. For example, the processor 1701 is configured to support the time synchronization apparatus 1700 in performing S401 and S402 in FIG. 4, S601 in FIGS. 6, S701 to S703 in FIGS. 7, S801 and S802 in FIGS. 8, S901 and S902 in FIGS. 9, S1001 and S1004 in FIG. 10, S1101 in FIGS. 11, S1201 and S1204 in FIG. 12, and/or another process of the technology described in this specification. The transceiver 1702 is configured to perform S403 in FIG. 4, S602 to S604 in FIG. 6, S704 in FIG. 7, S803 to S805 in FIG. 8, S903 to S905 in FIG. 9, S1002, S1003, and S1005 in FIG. 10, S1102 in FIG. 11, or S1202 and S1203 in FIG. 12. Optionally, the time synchronization apparatus 1700 may further include a memory 1703. The memory 1703 is configured to store program code and data that are corresponding to any foregoing time synchronization method performed by the time synchronization apparatus 1700. The memory 1703 may be a read-only memory (ROM), another type of static storage device capable of storing static information and instructions, a random access memory (RAM), or the like.

The method or algorithm steps described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist as discrete components in a core network interface device.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose computer or a dedicated computer.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on technical solutions of this application shall fall within the protection scope of this application.

What is claimed is:

1. A time synchronization method, comprising:
sending, by a centralized unit (CU) through an F1 interface, a request message to a distributed unit (DU) in a CU-DU split architecture, wherein the request message is used to request time information and a reference system frame number (SFN) corresponding to the time information, and wherein the time information indicates a moment corresponding to an end boundary of the reference SFN;
receiving, by the CU through the F1 interface, the time information and the reference SFN from the DU; and
sending, by the CU, the time information and the reference SFN to a terminal by using dedicated signaling.

2. The method according to claim 1, wherein the receiving, by the CU, the time information and the reference SFN from the DU comprises:
periodically receiving, by the CU, the time information and the reference SFN from the DU.

3. The method according to claim 2, wherein a periodicity at which the CU receives the time information and the reference SFN from the DU is indicated by the CU.

4. The method according to claim 1, wherein time type information (timeInfoType) of the time information is a local clock.

5. The method according to claim 1, wherein the time information is a local time or a global positioning system (GPS) time.

6. The method according to claim 1, wherein the time information comprises uncertain information of time.

7. The method according to claim 1, wherein a time unit of the time information is nanosecond or millisecond.

8. A time synchronization system, comprising a centralized unit (CU), a distributed unit (DU), and a terminal, wherein:
the CU is configured to send, through an F1 interface, a request message to the DU in a CU-DU split architecture, wherein the request message is used to request time information and a reference system frame number (SFN) corresponding to the time information, and wherein the time information indicates a moment corresponding to an end boundary of the reference SFN;

the DU is configured to:
   receive, through the F1 interface, the request message from the CU; and
   send, through the F1 interface, the time information and the reference SFN to the CU; and the CU is further configured to:
   receive, through the F1 interface, the time information and the reference SFN from the DU; and
   send the time information and the reference SFN to the terminal by using dedicated signaling.

9. The system according to claim 8, wherein the CU is configured to periodically receive the time information and the reference SFN from the DU.

10. The system according to claim 8, wherein a periodicity at which the CU receives the time information and the reference SFN from the DU is indicated by the CU.

11. The system according to claim 8, wherein time type information (timeInfoType) of the time information is a local clock.

12. The system according to claim 8, wherein the time information is a local time or a global positioning system (GPS) time.

13. The system according to claim 8, wherein the time information comprises uncertain information of time.

14. The system according to claim 8, wherein a time unit of the time information is nanosecond or millisecond.

* * * * *